US008078110B2

(12) United States Patent
Li et al.

(10) Patent No.: US 8,078,110 B2

(45) **Date of Patent: *Dec. 13, 2011**

(54) TECHNIQUES FOR CHOOSING AND BROADCASTING RECEIVER BEAMFORMING VECTORS IN PEER-TO-PEER (P2P) NETWORKS

(75) Inventors: Junyi Li, Bedminster, NJ (US); Xinzhou Wu, Monmouth Junction, NJ (US); Rajiv Laroia, Far Hills, NJ (US); Aleksandar Jovicic, Urbana, IL (US)

(73) Assignee: QUALCOMM Incorporated, San Diego, CA (US)

(*) Notice: Subject to any disclaimer, the term of this patent is extended or adjusted under 35 U.S.C. 154(b) by 734 days.

This patent is subject to a terminal disclaimer.

(21) Appl. No.: 12/168,721

(22) Filed: Jul. 7, 2008

(65) Prior Publication Data

US 2009/0019150 A1 Jan. 15, 2009

Related U.S. Application Data

(60) Provisional application No. 60/948,671, filed on Jul. 9, 2007.

(51) Int. Cl.
*H04B 1/00* (2006.01)

(52) U.S. Cl. .................... 455/63.1; 455/67.13; 455/570; 455/114.2; 375/267

(58) Field of Classification Search ................. 455/63.1, 455/67.13, 570, 114.2, 226.3, 277.2, 278.1; 375/267; 370/329
See application file for complete search history.

(56) References Cited

U.S. PATENT DOCUMENTS 7,289,481 B2 * 10/2007 Wax et al. ..................... 370/338
7,620,423 B2 * 11/2009 Jin et al. ..................... 455/562.1
7,634,015 B2 * 12/2009 Waxman ....................... 375/260
7,656,936 B2 * 2/2010 Li et al. ......................... 375/148
7,747,285 B2 * 6/2010 Lozano ...................... 455/562.1
7,898,478 B2 * 3/2011 Niu et al. ..................... 342/377
(Continued)

FOREIGN PATENT DOCUMENTS

EP 0773636 A1 5/1997
(Continued)

OTHER PUBLICATIONS

International Search Report and Written Opinion—PCT/US08/069440, International Searching Authority—European Patent Office, May 15, 2009.

*Primary Examiner* — Minh D Dao

(74) *Attorney, Agent, or Firm* — Peng Zhu; James K. O'Hare

(57) ABSTRACT

One feature provides for establishing an ad hoc peer-to-peer network over an existing channel allocation for another network. To mitigate interference between multiple peer-to-peer devices, a plurality of receiver chains in a receiver device may be configured with beamforming coefficients so as to focus reception in the direction of an intended signal from a transmitter device while minimizing reception from other directions. Similarly, the receiver device may also use a plurality of antennas and a transmitter chain to beamform in the direction of the transmitter device, thereby focusing its transmission toward the transmitter device. The receiver device may also notify nearby devices that it is employing a plurality of receive antennas. This information can be used by the nearby devices to more intelligently perform transmitter yielding. By utilizing beamforming information to make the transmitter and/or receiver yielding decision, better interference mitigation may be achieved.

40 Claims, 14 Drawing Sheets

U.S. PATENT DOCUMENTS

2004/0146024 A1* 7/2004 Li et al. ......................... 370/334
2006/0135097 A1 6/2006 Wang et al.
2006/0262943 A1* 11/2006 Oxford ........................... 381/92
2007/0189408 A1* 8/2007 Waxman ....................... 375/267
2008/0014870 A1* 1/2008 Kim ................................ 455/69
2008/0130764 A1* 6/2008 Xia et al. ...................... 375/259
2008/0165728 A1* 7/2008 Liu et al. ....................... 370/329
2009/0015478 A1* 1/2009 Li et al. ......................... 342/377
2009/0046765 A1* 2/2009 Xia et al. ...................... 375/141
2009/0264087 A1* 10/2009 Chae et al. ................. 455/114.2
2010/0220601 A1* 9/2010 Vermani et al. ............... 370/248
2010/0309854 A1* 12/2010 Wu et al. ....................... 370/329
2011/0002219 A1* 1/2011 Kim et al. ..................... 370/203

FOREIGN PATENT DOCUMENTS

WO WO03032522 A2 4/2003
WO WO03075469 A2 9/2003
WO WO2007011182 1/2007
WO WO2007023271 3/2007

* cited by examiner

TECHNIQUES FOR CHOOSING AND BROADCASTING RECEIVER BEAMFORMING VECTORS IN PEER-TO-PEER (P2P) NETWORKS

CLAIM OF PRIORITY UNDER 35 U.S.C. §119

The present Application for Patent claims priority to U.S. Provisional Application No. 60/948,671 entitled "Techniques for Choosing and Broadcasting Receiver Beamforming Vectors in Peer-to-Peer (P2P) Networks" filed Jul. 9, 2007, and assigned to the assignee hereof and hereby expressly incorporated by reference herein.

BACKGROUND

1. Field

At least one aspect relates to wireless communications within a peer-to peer (P2P) network and, in particular, the methods by which mobile stations (peers) choosing yielding thresholds based on the receiver beamforming capability.

2. Background

In a wireless network, e.g., an ad hoc peer-to-peer network, in which a network infrastructure does not exist, a terminal has to combat certain challenges in order to set up a communication link with another peer terminal. Due to the ad hoc nature of peer-to-peer networks, one challenge is mitigate or prevent interference between different peer-to-peer transmissions. More particularly, because the peer-to-peer connections may share a frequency spectrum, it is possible that two peer-to-peer transmissions may interfere with each other.

Consequently, a way is needed to mitigate interference between peer-to-peer connections.

SUMMARY

Interference mitigation between peer-to-peer connections may be achieved by a protocol in which transmitter and/or receiver yielding is implemented. Such transmitter and/or receiver yielding may be further improved by using a plurality of antennas, receiver chains, and/or transmitter chains.

A second device equipped with a plurality of antennas is provided for facilitating a wireless peer-to-peer connection with a first device. The second device may operate a plurality of receive chains each being coupled with one of the plurality of antennas. A first transmission request signal may be received by the second device from the first device. The first transmission request signal indicating that the first device intends to transmit a traffic signal to the second device. The first transmission request signal may be received in each of the plurality of antennas using the receive chains. The second device may monitor (a shared frequency spectrum) to receive a second transmission request signal. The second transmission request signal being transmitted by a third device and indicating that the third device intends to transmit a traffic signal to a fourth device. The second transmission request signal may also be received in each of the plurality of antennas. The second device may then determine a plurality of receive beamforming coefficients as a function of the received first and second transmission request signals in each of the plurality of antennas, each of the plurality of receive beamforming coefficients corresponding to one of the plurality of antennas. The second device may then transmit a request response signal to the first device indicating that the second device is ready to receive a traffic signal from the first device. Subsequently, the second device may receive a traffic signal from the first device, the traffic signal being received in each of the plurality of antennas. The traffic signal received from the plurality of antennas are combined using the plurality of receive beamforming coefficients. The second device may then decode the combined traffic signal.

In one example, the second device may be equipped with a plurality of transmit chains each being coupled with one of the plurality of antenna, and wherein the request response signal is transmitted via the transmit chains with the plurality of antennas. To do this, the second device may multiply the request response signal to be transmitted with each of the plurality of receive beamforming coefficients to generate a weighted request response signal. Each weighted request response signal is then transmitted with the corresponding one of the plurality of antennas.

In another example, the second device may equipped with one transmit chain being connected via a switch to be coupled with one of the plurality of antenna at any given time. The request response signal is transmitted via the transmit chain with the plurality of antennas. The second device may then multiply the request response signal with a first one of the plurality of receive beamforming coefficients to generate a first weighted request response signal. The transmit chain may be switched to one of the plurality of antennas corresponding to the first one of the plurality of receive beamforming coefficients. The first weighted request response signal is transmitted using the corresponding one of the plurality of antennas in a first request response transmission time slot. The second device may then multiply the request response signal with a second one of the plurality of receive beamforming coefficients to generate a second weighted request response signal. The transmit chain is then switched to be coupled with one of the plurality of antennas corresponding to the second one of the plurality of receive beamforming coefficients. The second weighted request response signal is then transmitted by the second device with the corresponding one of the plurality of antennas in a second request response transmission time slot. The second request response transmission time slot being subsequent to the first request response transmission time slot.

In yet another example, the second device may be equipped with one transmit chain coupled to a first antenna from the plurality of antennas, where a request response signal is transmitted via a transmit chain coupled to the first antenna. The second device combines the first transmission request signal received from the plurality of receive antennas using the determined plurality of receive beamforming coefficients. Similarly, the second transmission request signal received from the plurality of receive antennas is combined using the determined plurality of receive beamforming coefficients. The second device may then calculate a ratio of the power of the combined first transmission request signal and the power of the combined second transmission request signal. The second device can then determine whether the calculated power ratio is acceptable by comparing the calculated power ratio with a threshold. A control message may be sent by the second device to the third device. The control message may indicate that the third device is allowed to proceed to transmit a traffic signal, if it is determined that the calculated power ratio is acceptable.

In another example, the second device may be equipped with one transmit chain coupled to a first antenna from the plurality of antennas, where a request response signal is transmitted via a transmit chain coupled to the first antenna. The second device combines the first transmission request signal received from the plurality of receive antennas using the determined plurality of receive beamforming coefficients. The power of the combined first transmission request signal is then calculated. A spatial correlation coefficient of the first and second transmission request signals received from the plurality of receive antennas is then calculated. The second device then determines a transmission power for the request response signal to be transmitted to the first device. Such transmission power may be determined as a function of the power of the combined first transmission request signal and the spatial correlation coefficient. In one instance, the transmission power of the request response signal may be the power of the combined first transmission request signal multiplied by the spatial correlation.

In another example, the second device may be equipped with one transmit chain coupled to a first antenna from the plurality of antennas, where a request response signal is transmitted via a transmit chain coupled to the first antenna. The second device may monitor (a frequency spectrum) to receive a third transmission request signal in each of the plurality of antennas, the third transmission request signal being transmitted by another transmitter device and indicating that the another transmitter device intends to transmit a traffic signal to yet another receiver device. A spatial correlation coefficient of the first and third transmission request signals received from the plurality of receive antennas may be calculated by the second device. The second device can then determine the transmission power of the request response signal transmitted to the first device as a function of the power of the combined first transmission request signal and maximum of the spatial correlation coefficient of the first and second transmission request signals and the spatial correlation coefficient of the first and third transmission request signals.

A third wireless device is also provided having a connection with a fourth device. The third device may transmit a first transmission request signal to the fourth device, the first transmission request signal indicating that the third device intends to transmit a traffic signal to the fourth device. The third device may monitor (a frequency spectrum) to receive a first request response signal from the fourth device, where the first request response signal may indicate that the fourth device is ready to receive a traffic signal from the third device. Similarly, the third device may monitor to receive a second request response signal from a second device, the second request response signal indicating that the second device is ready to receive a traffic signal from a first device. Likewise, the third device may further monitor to receive a third request response signal from the second device, the third request response signal indicating that the second device is ready to receive a traffic signal from the first device. The third request response signal may be received subsequently to the second request response signal. The received second and third response signals are then added or combined to form a combined signal. A power of the combined signal may then be calculated. An interference cost to the first device may also be calculated where the interference cost may be a function of the calculated power of the combined signal.

The third device may determine whether to transmit a traffic signal to the fourth device by comparing the calculated interference cost with a transmitter yielding threshold. If the third device determines that the interference cost is less than the transmitter threshold, it may transmit a traffic signal to the fourth device. Prior to receiving the second and third request response signals, the third device may receive a control message, the control message indicating that the second device is capable of receive beamforming. The control message may include information indicative of the number of the plurality of receive antennas equipped at the second device.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
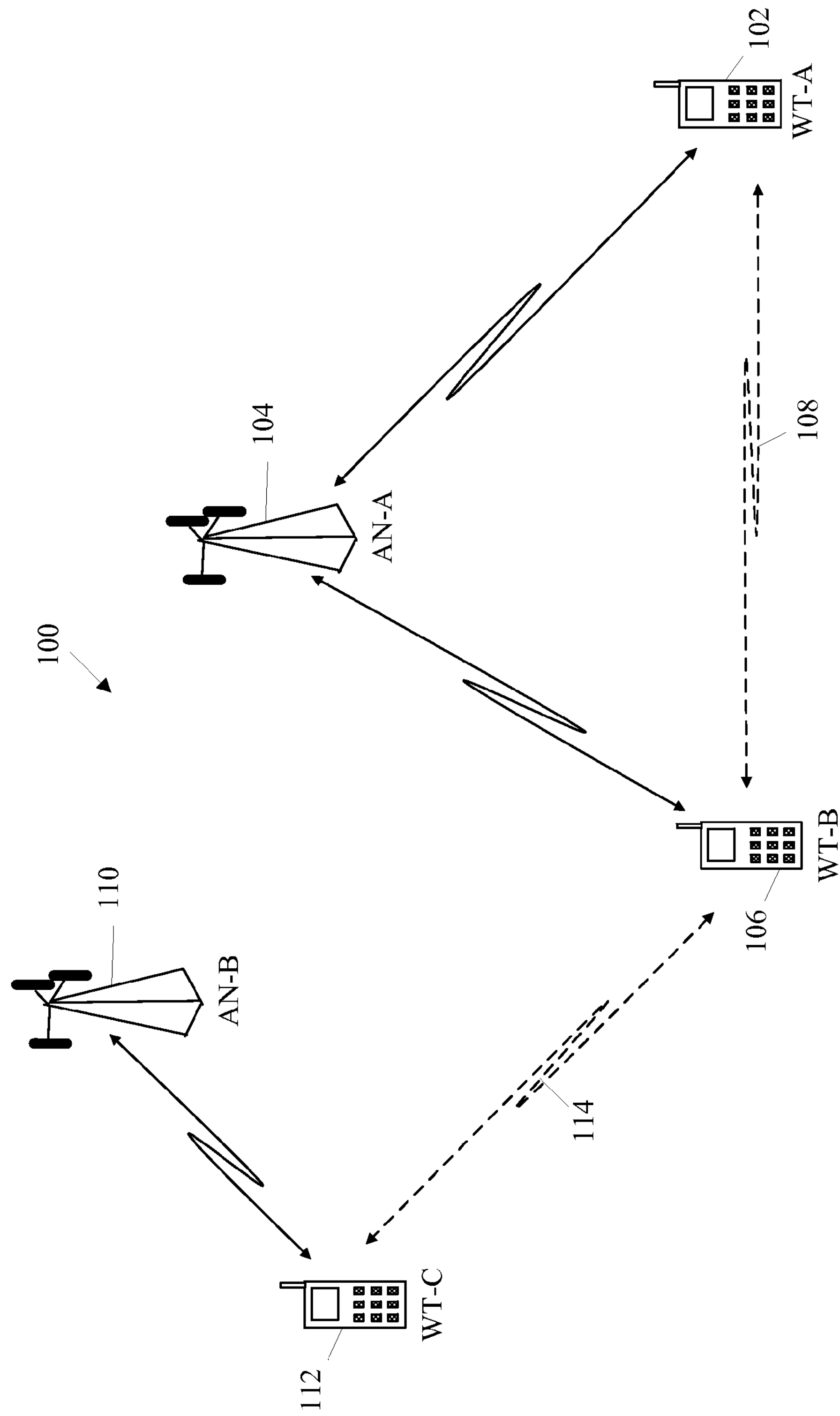
FIG. 1 is a block diagram illustrating the how an ad hoc peer-to-peer network may be implemented, e.g., in conjunction a wide area network.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Overview

One feature provides for establishing an ad hoc peer-to-peer network over an existing channel allocation for another network. To mitigate interference between multiple peer-to-peer devices, a plurality of receiver chains in a receiver device may be configured with beamforming coefficients so as to focus reception in the direction of an intended signal from a transmitter device while minimizing reception from other directions. Similarly, the receiver device may also use a plurality of antennas and a transmitter chain to beamform in the direction of the transmitter device, thereby focusing its transmission toward the transmitter device. The receiver device may also notify nearby devices that it is employing a plurality of receive antennas. This information can be used by the nearby devices to more intelligently perform transmitter yielding. By utilizing beamforming information to make the transmitter and/or receiver yielding decision, better interference mitigation may be achieved.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers (terminals), desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., orthogonal frequency-division multiplexing (OFDM) symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Figure 2:
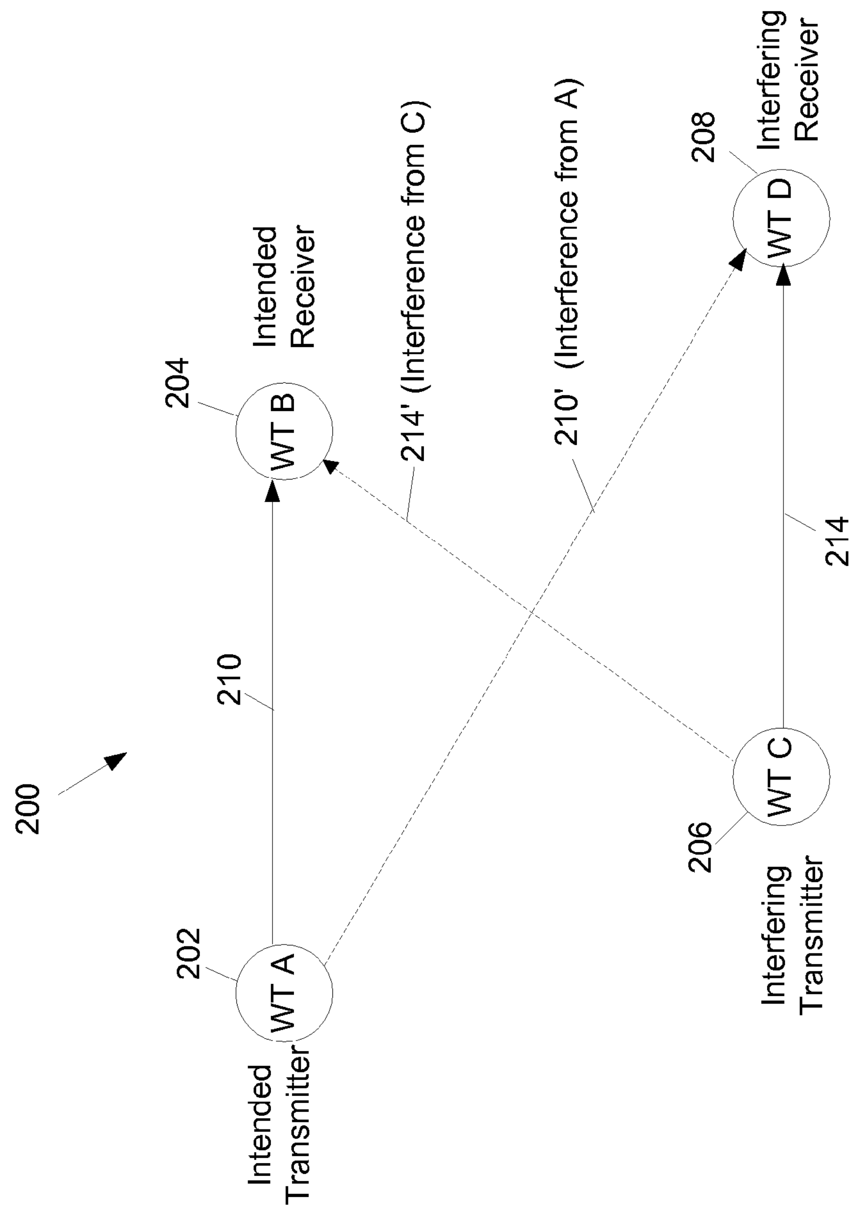
FIG. 2 is a block diagram illustrating an environment in which a plurality of wireless terminals may establish peer-to-peer communication connections that may cause interference to other nearby wireless terminals.

FIG. 2 is a block diagram illustrating an environment in which a plurality of wireless terminals may establish peer-to-peer communication connections that may cause interference to other nearby wireless terminals. A peer-to-peer network 200 may include a plurality of wireless terminals that may share and/or concurrently use a frequency spectrum. The shared frequency spectrum may include one or more transmission and/or control channels, with each transmission (traffic) channel having a corresponding traffic control channel. In one example, the traffic control channel may be used to send a traffic request for communications over a corresponding transmission (traffic) channel.

In one example, a first wireless terminal WT A 202 may be attempting to transmit 310 to a second wireless terminal WT B 204 while a third wireless terminal WT C 206 is concurrently attempting to transmit 214 to a fourth wireless terminal WT D 208 using the same traffic channel bandwidth resource. The first wireless terminal WT A 202 may be referred to as the intended transmitter, the second wireless terminal WT B 204 may be referred to as the intended receiver, and the third wireless terminal WT C 206 may be considered the interferer. In this peer-to-peer network 200, a transmission and control channel pair may be shared by the plurality of the wireless terminals WT A, WT B, WT C, and WT D. However, because such transmission (traffic) and/or control channel is shared (e.g., frequency spectrum sharing) by the wireless terminals, it may also result in unwanted interference 214' and 210' among the wireless terminals. For instance, if both transmissions 210 and 214 actually take place, then the signal 214' from the third wireless terminal WT C 206 may be seen as interference to the second wireless terminal WT B 204 receiver and may degrade its ability to successfully recover the desired signal 210 from the first wireless terminal WT A 202. Therefore, certain interference management protocol is needed to manage interference from the third wireless terminal WT C 206 to the second wireless terminal WT B 204. One goal of the interference management protocol is to allow the third wireless terminal WT C 206 to transmit without creating excessive interference to the second wireless terminal WT B 204, thereby increasing the overall throughput and improving the system performance. Note that in the meantime, the first wireless terminal WT A 202 may also cause interference 210' to the fourth wireless terminal WT D 208, and a similar interference management protocol may also be used to control that interference.

Because there is no centralized traffic management authority, there is a chance that WT A 202 and WT C 206 may transmit on the same or overlapping channel, thereby causing interference with each other. For example, by coincidence, both WT A 202 and WT C 206 may use the same transmission CID. A transmission CID may be used to indicate a particular transmission channel (e.g., frequency or time slot) to a receiving terminal WT B 204 and 208. Consequently, when the same transmission CID is used by two terminals, they may also be concurrently transmitting on the same channel or overlapping channels. If both transmitting terminals WT A 202 and WT C 206 are within range of the receiver terminals WT B 204 and/or WT D 208, then the receiver terminals WT B 204 and/or WT D 208 may perceive interference.

In particular, a way is needed that allows multiple wireless terminals to choose channels within the shared frequency spectrum without distinguish between transmissions from an intended peer and those from an unintended peer.

According to one implementation, transmitter and/or receiver yielding may be implemented by devices in a peer-to-peer network that allows a device to backoff if it is likely to experience interference from other nearby devices of higher priority or cause interference to them. Consequently, if the first connection 210 between the first device WT A 202 and second device WT B 204 has a higher priority than the second connection 214 between the third device WT C 206 and the fourth device WT D 208, the third device WT C 206 may implement transmitter yielding and/or the fourth device WT D 208 may implement receiver yielding. When yielding, a device may determine whether its transmission power will unacceptably interfere with transmissions of other nearby devices. Such yielding may also take into account the relative priority of the different transmissions or peer-to-peer connections associated with such transmissions. For instance, a device may decide to yield only if it has a lower connection or transmission priority than another connection or transmission.

In a peer-to-peer network, a connection scheduling stage and a rate scheduling stage may be employed to transmit traffic. In the connection scheduling stage, transmitter-receiver pairs in the network attempt to decide which peer pairs will transmit in a particular time slot. This can be done by letting the transmitter devices send out transmit requests with a fixed power and the receiver devices echo back the requests with a power inversely proportional to the channel gain between them. A transmitter device decides to yield its traffic transmissions on a particular time slot if it sees an echo from one of the other receiver devices (not its peer) with a higher priority and strong enough signal strength. A priority can be quality of service (QoS)-based or purely random tokens generated randomly at each time slot. More precisely, a lower priority transmitter device yields to a higher priority transmitter device if $$\frac{h_{11}}{h_{21}} < SINR_{Tx},$$

where $h_{11}$ represents the channel gain between the transmitter-receiver pair and $h_{21}$ represents interference from the interfering transmitter device. In other words, the lower priority transmitter device WT C 206 makes sure its interference 214' to the higher-priority receiver device WT B204 relative to the higher-priority transmission signal strength is bounded. This part is usually referred as transmitter-yielding. In one example of transmitter yielding, a transmitting device may determine whether its own transmissions will cause unacceptable interference to another device utilizing a shared channel, and if so, it may not send data transmissions on that shared channel.

On the other hand, each receiver will also measure its own signal strength and the interference from the higher-priority transmitters and decide to yield if $$\frac{h_{11}}{\sum h_{i1}} < SINR_{Rx}.$$

In one example of receiver yielding, a receiver device WT D 208 may not send an echo or reply transmission (e.g., in response to a transmission request) if its signal-to-noise ratio is too low, thereby preventing a corresponding interfering transmitting device WT C 206 from sending traffic to the receiver device WT D 208 on the selected channel. In another example, the receiver device may indicate that a lower transmit power should be used by its corresponding transmitter device to avoid interference.

Receiver Beamforming

With receiver beamforming capability, a receiver device can choose to beamform to better receive transmissions from an intended transmitter device. This can be done by measuring the channel receive signature in the transmission request during the connection scheduling stage. Other beamforming vectors are also possible. According to one example, the peer-to-peer network shares bandwidth (.e.g., a frequency spectrum) with an infrastructure cellular network (e.g., a wide area network). If a receiver device notices another device in its vicinity and has some measurement of its spatial signature, the receiver device can choose to null the interference from that another device. That is, the receiver can select a beamforming vector that focuses its reception toward the direction of its intended transmissions from its peer transmitter device. Note that, as used herein, a "receiver device" may be a wireless terminal that is the intended target of transmissions from another terminal in a peer-to-peer connection. The "receiver device" is capable of both transmission and reception within the peer-to-peer connection. In other instances, a "receiver device" may become a "transmitter device" when it initiates communications with another terminal.

Figure 3:
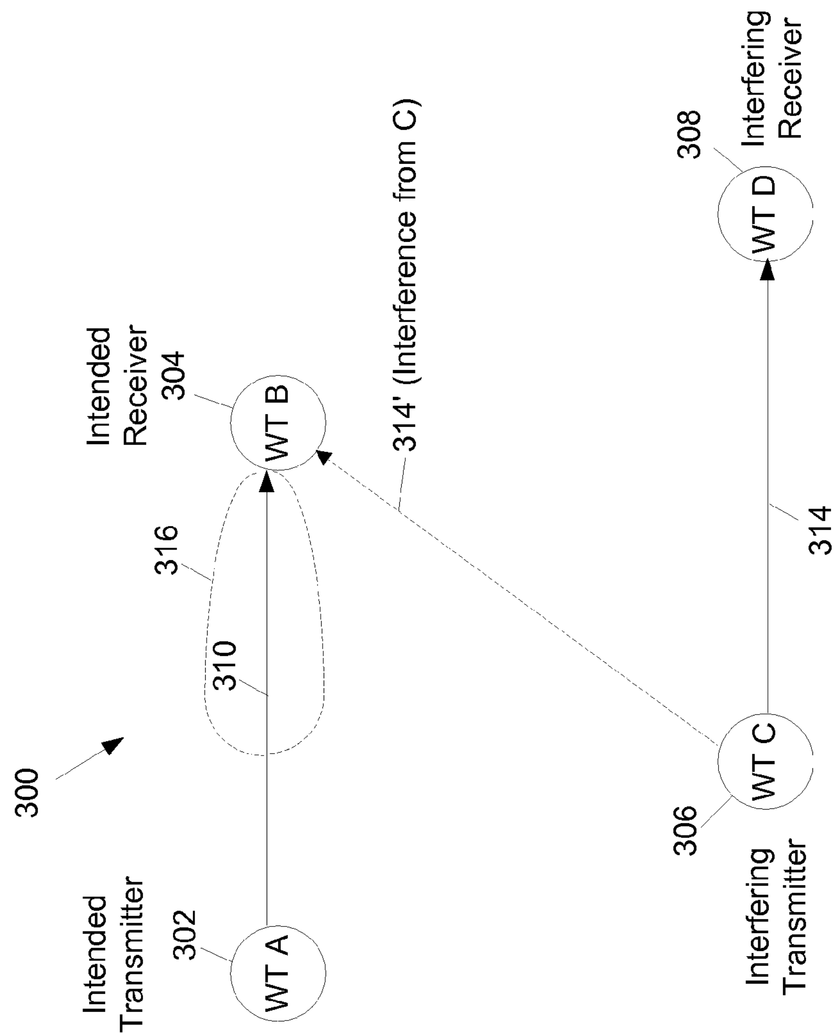
FIG. 3 illustrates one example of how multiple receive antennas may be used by a wireless device to mitigate interference from other peer-to-peer transmission.

FIG. 3 illustrates one example of how multiple receive antennas may be used by a wireless device to mitigate interference from other peer-to-peer transmission. In this example, a first device WT A 302 intends to communicate with a second device WT B 304 over a peer-to-peer connection 310. However, transmissions 314 from a third device WT C 306 to a fourth device WT D 308 may be seen as interference by the second device WT B 304.

Where the second device WT B 304 is equipped with multiple receive antennas, a more intelligent receiver yielding and/or rate scheduling may be performed. That is, the multiple receive antennas allow the second device WT B 304 to focus its reception 316 in the direction of its intended signal from the first device WT A 302. This allows the second device WT B 304 to tolerate greater interference than it otherwise would.

According to one feature, the receiver second device WT B 304 may select a yielding signal-to-interference-plus-noise ratio (SINR) threshold based on its beamforming capability. For instance, the more receive antennas the second device WT B 304 has, the greater interference it is able to take from the interfering third device WT C 306.

In the rate scheduling stage, the scheduled transmitter devices send out pilots to measure the channel and the receiver devices send a feedback indicating a rate option to use.

To enable receiver beamforming for receivers with multiple antennas, a scheduled receiver device may attempt to estimate the transmission rates with the receiver beamforming. There are multiple choices for receiver beamforming depending on the implementation complexity that a wireless device can support. In one example, the second device WT B 304 may implement a matched-filter type of beamforming to maximize the signal strength from its transmitter device WT A 302. In another example, an interference nulling (zero-forcing) scheme may be implemented by the second device WT B 304 to minimize the interference seen by the second device WT B 304. In yet another example, linear minimum mean square error (MMSE) can be used by the second device WT B 304 to maximize the SINR of the received signal at the cost of calculating a matrix inversion. However, such receiver-only approaches fail to obtain good channel estimation in the rate scheduling stage, not only for the channel between the transmitter first device WT A 302 and the receiver second device WT B 304, but also an interference spatial correlation matrix. There are multiple ways to achieve good channel estimation depending on the signaling method of the pilots.

However, more intelligence can be added to the receiver device to further improve the system capacity under receiver beamforming. That is, receiver devices with receiver beamforming capability can tolerate stronger interference as compared to a single-antenna receiver device. Thus, depending on the number of antennas and receiver algorithms a wireless terminal can support, a wireless terminal can choose different thresholds $SINR_{Tx}$ and $SINR_{Rx}$ for yielding decisions. Generally speaking, the more antennas a receiver device has, it should choose lower yielding thresholds. Between different beamforming strategies, receiver devices capable of MMSE beamforming should use lower thresholds as compared to simple matched-filter beamforming or zero-forcing beamforming. It can be easily seen that such a scheme can be used in a heterogeneous P2P network where wireless terminals with different number of receiver antennas coexist.

Receiver Beamforming for Receiving

Figure 4:
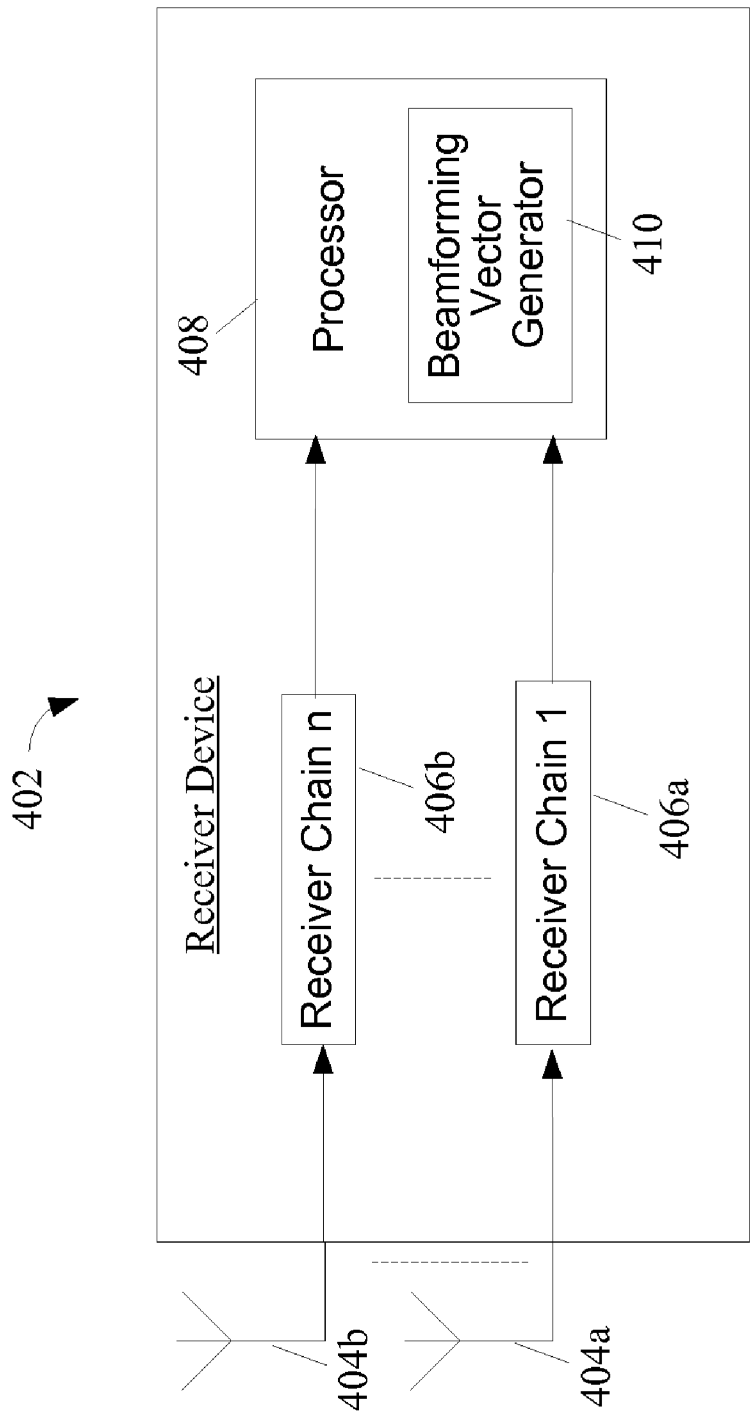
FIG. 4 is a block diagram illustrating a receiver device having multiple receive chains for beamforming.

FIG. 4 is a block diagram illustrating a receiver device 402 having multiple receive chains for beamforming. The receiver device 402 includes a plurality of receive antennas 404, where each antenna is coupled to a different receiver chain 406. The receiver chains 406*a* and 406*b* are coupled to a processor 408 where a beamforming vector generator 410 can calculate beamforming coefficients for each receiver chain 406.

Figure 5:
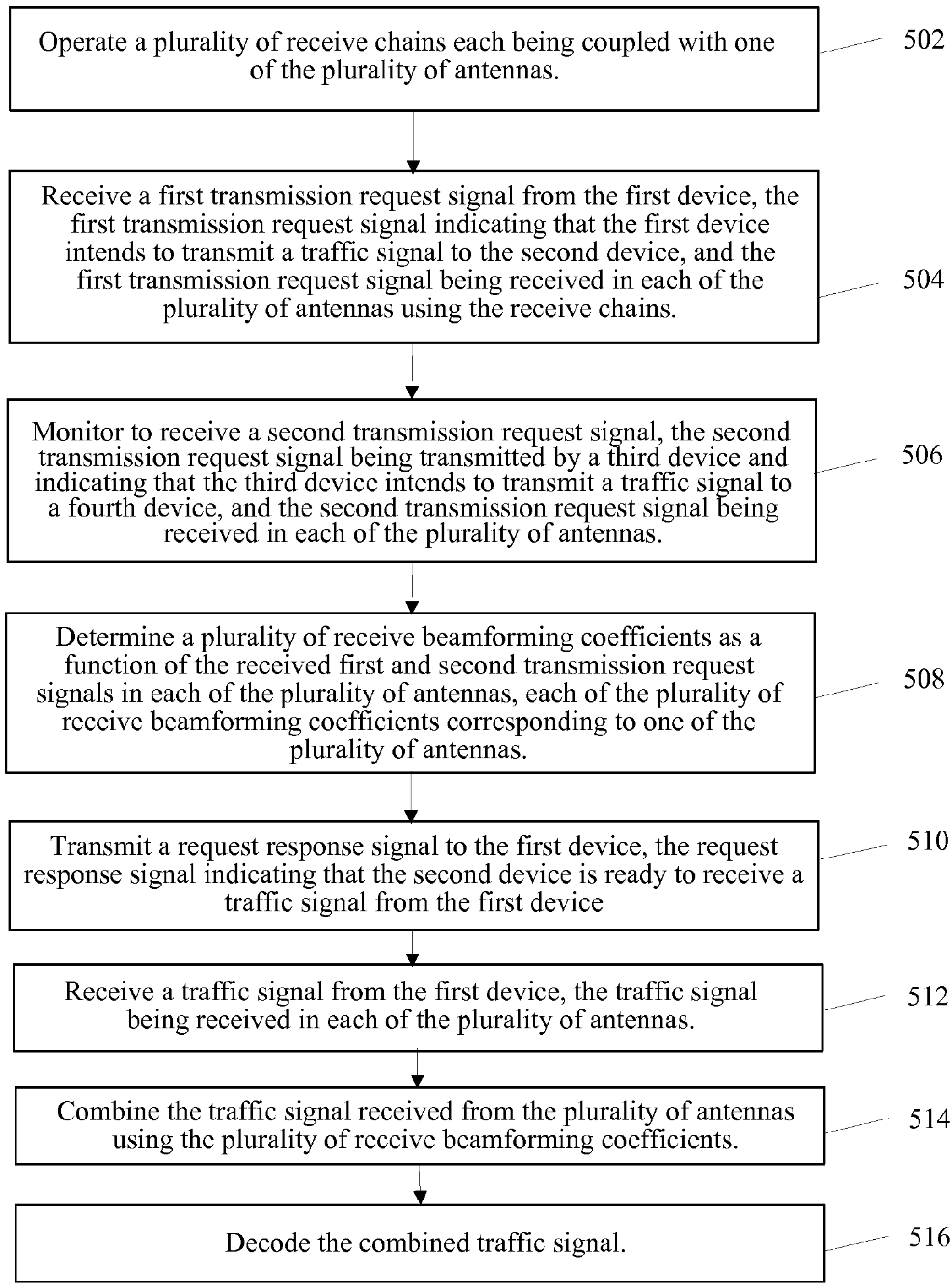
FIG. 5 illustrates a method operational in a receiver second device having a plurality of receive antennas for peer-to-peer communications with a transmitter first device.

FIG. 5 illustrates a method operational in a receiver second device having a plurality of receive antennas for peer-to-peer communications with a transmitter first device. The receiver second device operates a plurality of receive chains each being coupled with one of the plurality of antennas 502. A first transmission request signal may be received from the first device, where the first transmission request signal indicates that the first device intends to transmit a traffic signal to the second device, and the first transmission request signal being received in each of the plurality of antennas using the receive chains 504. The second device also monitors (a shared frequency spectrum) to receive a second transmission request signal, where the second transmission request signal is transmitted by a third device and indicating that the third device intends to transmit a traffic signal to a fourth device, and the second transmission request signal being received in each of the plurality of antennas 506. The second device may then determine a plurality of receive beamforming coefficients as a function of the received first and second transmission request signals in each of the plurality of antennas, each of the plurality of receive beamforming coefficients corresponding to one of the plurality of antennas 508. A request response signal may then be transmitted by the second device to the first device, the request response signal indicating that the second device is ready to receive a traffic signal from the first device 510.

The second device may also receive a traffic signal from the first device, where the traffic signal is received in each of the plurality of antennas 512. That is, each of the antennas may receive an instance of the traffic signal, which are then combined to recover the traffic signal. Traffic signal received from the plurality of antennas may be combined using the plurality of receive beamforming coefficients 514. The second device may then decode the combined traffic signal 516.

After a receiver device chooses a receiver beamforming vector, the receiver device may broadcasts its chosen beamforming vector to its neighbors in the receiver (Rx) part of the connection scheduling stage. That is, during the period of the connection scheduling stage when the receiver device is allowed to transmit, it transmits its receiver beamforming vectors. Several schemes are possible to broadcast the beamforming vector.

Receiver Beamforming for Transmitting—Multiple Transmitter Chains

In a first scheme, the receiver device has the capability to drive the same set of antennas for transmitting as well as receiving. That is, a receiver device has a plurality transmitter and receiver radio frequency chains. In this case, each receiver device does transmitter-beamforming in the Rx part of the connection scheduling stage using the same beamforming vector. That is, the receiver device transmits using beamforming, so that it directs its transmissions in the same direction as from where it is receiving transmissions from its intended transmitter device. This may be referred to as an "effective antenna", where the receiver device chooses the effective antenna (e.g., beamforming coefficients) in the transmitter (Tx) part of connection scheduling stage, and then uses the same effective antenna to transmit it echo or transmission request response.

Figure 6:
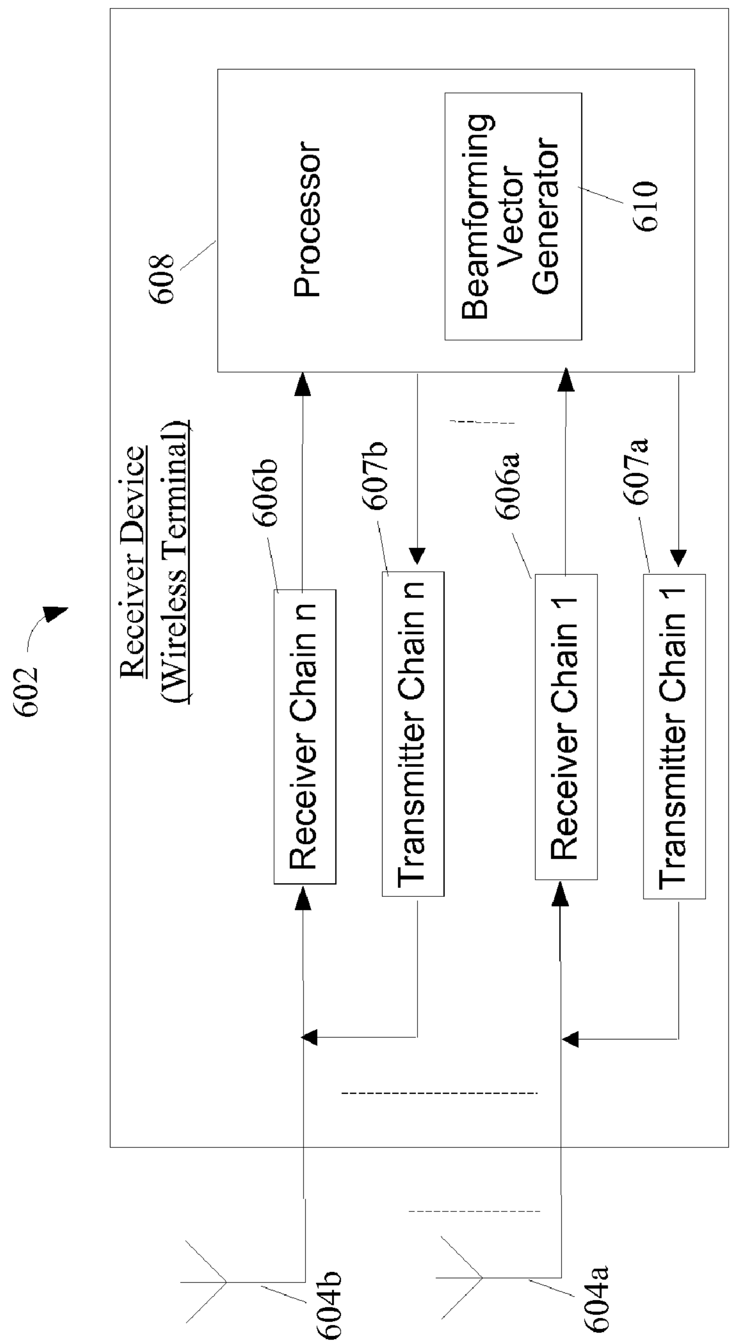
FIG. 6 is a block diagram illustrating a receiver device having multiple transmit and receive chains for beamforming.

FIG. 6 is a block diagram illustrating a receiver device 602 having multiple transmit and receive chains for beamforming. The receiver device 602 includes a plurality of antennas 604, where each antenna is coupled to a different receiver chain 606 and transmitter chain 607. The transmitter chains 607*a* and 607*b* and receiver chains 606*a* and 606*b* are coupled to a processor 608 where a beamforming vector generator 610 can calculate beamforming coefficients for each chain 606. According to one example, the beamforming vector generator 610 may obtain beamforming coefficients based on a received transmission request to focus the receiver in the direction of the received transmission request from an intended transmitter first device. The receiver device 602 then uses the same beamforming coefficients to direct its transmissions when sending a transmission request response (and possibly other transmissions).

Figure 7:
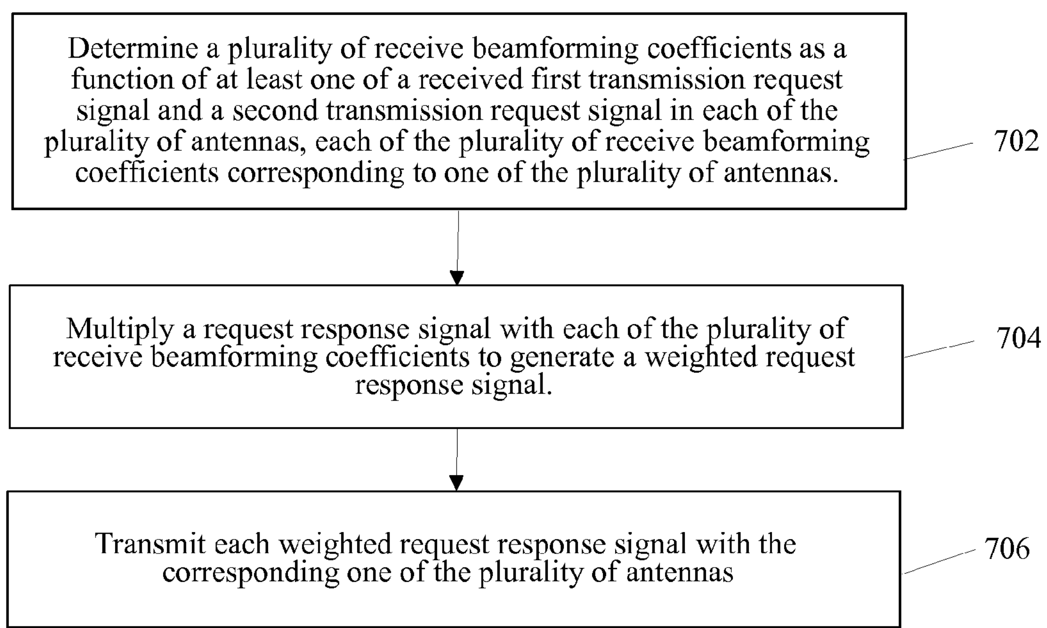
FIG. 7 illustrates a method operational in a receiver second device having a plurality of antennas for transmitting a signal over a peer-to-peer communications to a transmitter first device.

FIG. 7 illustrates a method operational in a receiver second device having a plurality of antennas for transmitting a signal over a peer-to-peer communications to a transmitter first device. The receiver second device operates a plurality of transmitter and receiver chains, each being coupled with one of a plurality of antennas. The second device may receive an intended first transmission request signal from an intended transmitter first device and, possibly, an unintended second transmission request signal from an interfering third device. The second device then determines a plurality of receive beamforming coefficients as a function of at least one of the received first transmission request signal and the second transmission request signal in each of the plurality of antennas, each of the plurality of receive beamforming coefficients corresponding to one of the plurality of antennas 702. That is, the beamforming coefficients may be selected to focus reception in the direction of the first transmission request signal while minimizing reception in the direction of the second transmission request signal. The second device can then reuse these beamforming coefficients with its transmitter chains when transmitting to the first device. For instance, the second device may multiply the request response signal with each of the plurality of receive beamforming coefficients to generate a weighted request response signal 704. Each weighted request response signal can then be transmitted with the corresponding one of the plurality of antennas 706.

Receiver Beamforming for Transmitting—Switched Transmitter Chains

In a second scheme, a receiver device may have less transmitter radio frequency (RF) chains as compared to the receive RF chains. As a consequence, it is not possible to use the same effective antenna in the Rx part to transmit an echo or response. For instance, the receiver device may have just one transmit RF chain and one power amplifier, but may have multiple antennas and an antenna switch that enables the receiver device to switch antennas for data transmission. In this case, a receiver device can still perfectly re-construct the effective antenna by sending back the echo or response in multiple Rx parts using different antennas.

Figure 8:
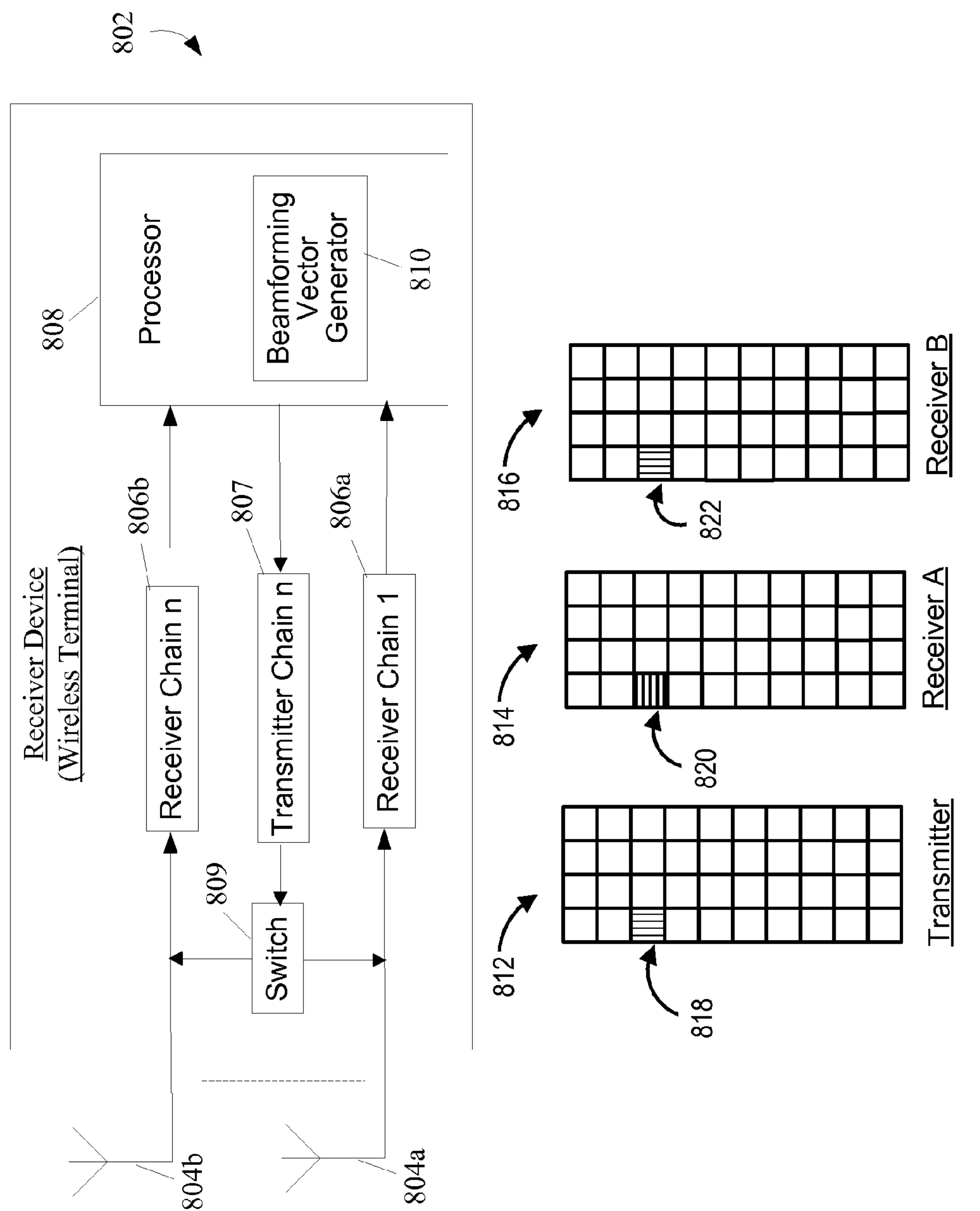
FIG. 8 is a block diagram illustrating a receiver device having multiple receive chains and a single switched transmitter chain for beamforming.

FIG. 8 is a block diagram illustrating a receiver device 802 having multiple receive chains and a single switched transmitter chain for beamforming. The receiver device 802 includes a plurality of antennas 804, where each antenna is coupled to a different receiver chain 806. A transmitter chain 807 is coupled to a switch 809 so that the receiver device can selectively transmit over any of the plurality of antennas 804. The transmitter chain 807 and receiver chains 806*a* and 806*b* are coupled to a processor 808 where a beamforming vector generator 810 can calculate beamforming coefficients for each chain 806. According to one example, the beamforming vector generator 810 may obtain beamforming coefficients based on a received transmission request to focus the receiver device in the direction of the received transmission request from an intended transmitter first device. The receiver device 802 then selectively uses the same beamforming coefficients to direct its transmissions when sending a transmission request response (and possibly other transmissions). That is, at any given moment, the transmitter chain 807 uses one of the beamforming coefficients corresponding to the antenna to which it is currently coupled by the switch 809. Therefore, the receiver device 802 may sequentially configure the transmitter chain 807 and switch 809 so that it can transmit the same signal over the plurality of antennas 804 using the corresponding beamforming coefficient for each antenna 804.

During a transmitter device transmission period, in which the receiver device 802 receives, the receiver device 802 may receive signals 818 (e.g., transmission request) on a time-frequency resource 812. It uses this received signal(s) 818 to obtain beamforming vectors for each of its antennas 804. During another period in which the receiver device 802 is allowed to transmit, the receiver device 802 may selectively transmit over each of its on corresponding time-frequency resources 814 and 818. For example, the receiver device 802 may first transmit an echo or response signal 820 on a first antenna 804*a*, using the beamforming coefficient corresponding to the first antenna 804*a* over a first resource 814. The receiver device 802 then transmits the echo or response signal 822 on a second antenna 804*b* using the beamforming coefficients for the second antenna 818. The transmitter device (for which these echo or response signals are intended) can reconstruct the echo or response signal by adding (combining) the signals received in the resources 814 and 816.

Figure 9:
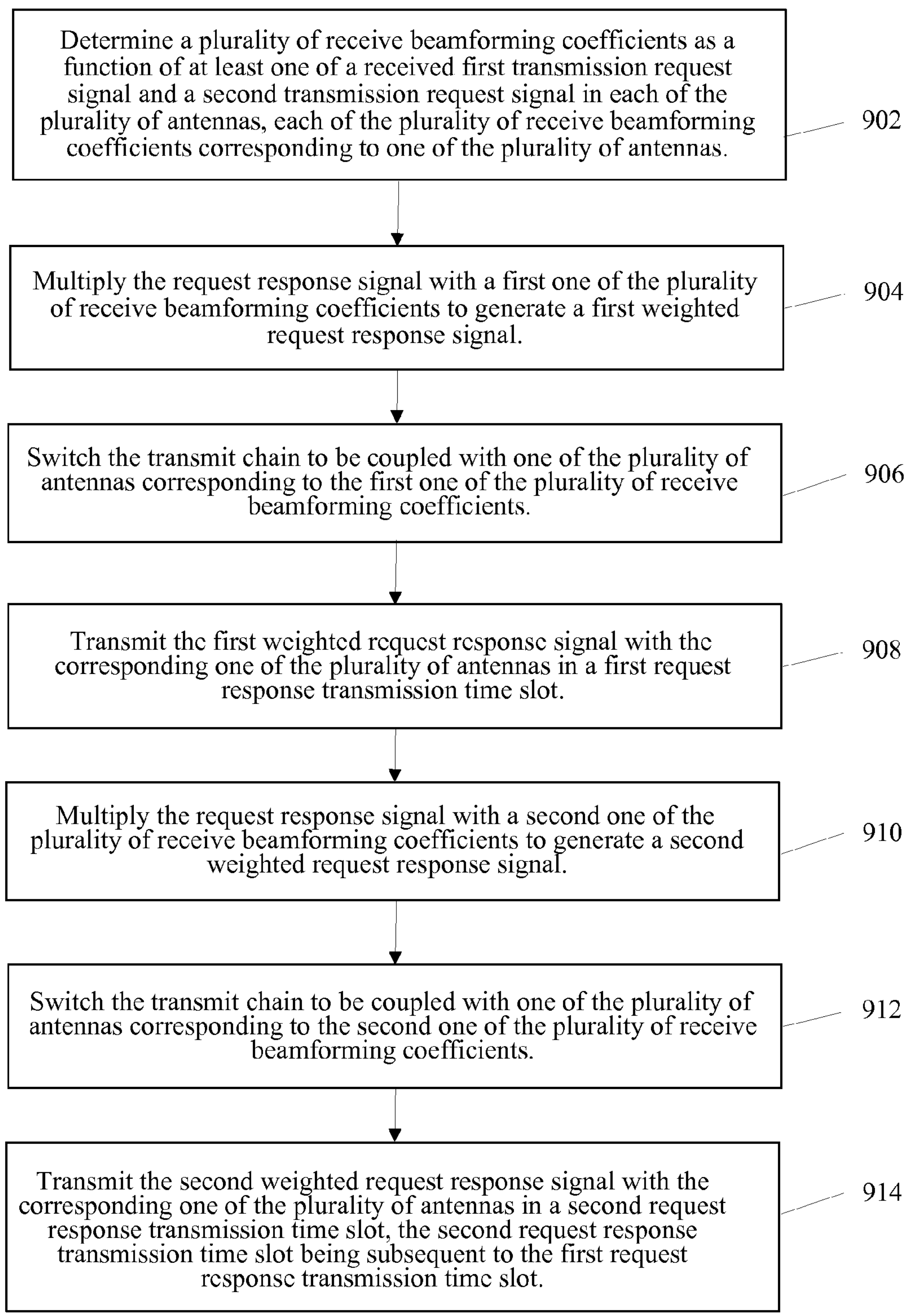
FIG. 9 illustrates a method operational in a receiver second device having a plurality of antennas and a single switched transmitter chain for transmitting a signal over a peer-to-peer communications to a transmitter first device.

FIG. 9 illustrates a method operational in a receiver second device having a plurality of antennas and a single switched transmitter chain for transmitting a signal over a peer-to-peer communications to a transmitter first device. That is, the second device is equipped with a plurality of receive chains and one transmit chain connected via a switch to be coupled with one of a plurality of antennas at any given time. The second device seeks to transmit a signal (e.g., request response signal) via the transmit chain with the plurality of antennas.

The second device may determine a plurality of receive beamforming coefficients as a function of at least one of a received first transmission request signal and a second transmission request signal in each of the plurality of antennas, each of the plurality of receive beamforming coefficients corresponding to one of the plurality of antennas 902. When seeking to transmit a request response signal, the second device may multiply the request response signal with a first one of the plurality of receive beamforming coefficients to generate a first weighted request response signal 904. The transmit chain is switched to one of the plurality of antennas corresponding to the first one of the plurality of receive beamforming coefficients 906. The second device can then transmit the first weighted request response signal with the corresponding one of the plurality of antennas in a first request response transmission time slot 908. The request response signal is also multiplied with a second one of the plurality of receive beamforming coefficients to generate a second weighted request response signal 910. The transmit chain is then switched to one of the plurality of antennas corresponding to the second one of the plurality of receive beamforming coefficients 912. The second device can then transmit the second weighted request response signal with the corresponding one of the plurality of antennas in a second request response transmission time slot, the second request response transmission time slot being subsequent to the first request response transmission time slot 914.

Receiver Beamforming for Transmitting—Single Transmitter Chain

In a third scheme, an antenna switch is not available at the receiver device. In other words, the receiver device has to broadcast the directivity information with an omni-directional antenna. In this case, the receiver can broadcast the directivity information as messages coded in the echoes. For example, the receiver sends out a small set of neighboring devices it can allow for sharing the spectrum because of its beamforming capability. This approach requires the ability to transmit information reliably over Rx echoes and might need a larger overhead for Rx echoes. Another approach can be that the receiver device chooses the echo power carefully based on the spatial signature from the interferers and the intended transmitter device. For example, it is assumed that a receiver device always tries to beamform to its intended transmitter and it can measure the spatial signature from all other neighboring devices. If there is one interferer device seen in the vicinity, clearly a receiver device can transmit with power Pρ, where ρ is the correlation between the spatial signature from the intended transmitter device and the one from the interferer device and P is the echo power which is chosen to be inversely proportional to the received power of the transmission request from the intended transmitter device. ρ is a number between 0 and 1, indicating that if the interferer device sends an interfering signal with power X, the effective interference power would be equivalent to the amount caused as if the interfering signal were sent at power Xρ, given the receive beamforming capability of the receiver. In other words, if ρ=1, e.g., the signals from the interferer and the desired transmitter arrive at the receiver along the same direction, then the beamforming capability of the receiver does not help too much, in which case the transmission power of the request response signal is the same as if the receiver does not have the beamforming capability. However, if if ρ=0, e.g., the signals from the interferer and the desired transmitter arrive at the receiver along orthogonal direction, then the beamforming capability of the receiver can significantly reject the interference, in which case the transmission power of the request response signal is very small thereby allowing the interferer not to yield to the receiver. This can accurately tell the interferer device about the interference it is causing without encoding any bits in the echo signal. The spatial correlation coefficient ρ is measured from the first and second transmission request signals received with the plurality of receive antennas. When there are multiple interferer devices, a preferred embodiment may be choose the echo power to be $\max_i P\rho_i$, where $\rho_i$ is the spatial correlation between interferer i and the intended transmitter. This choice of transmit power is preferred simply because it is conservative in the sense that it would not cause any interferer device which is supposed to yield to not yield.

Figure 10:
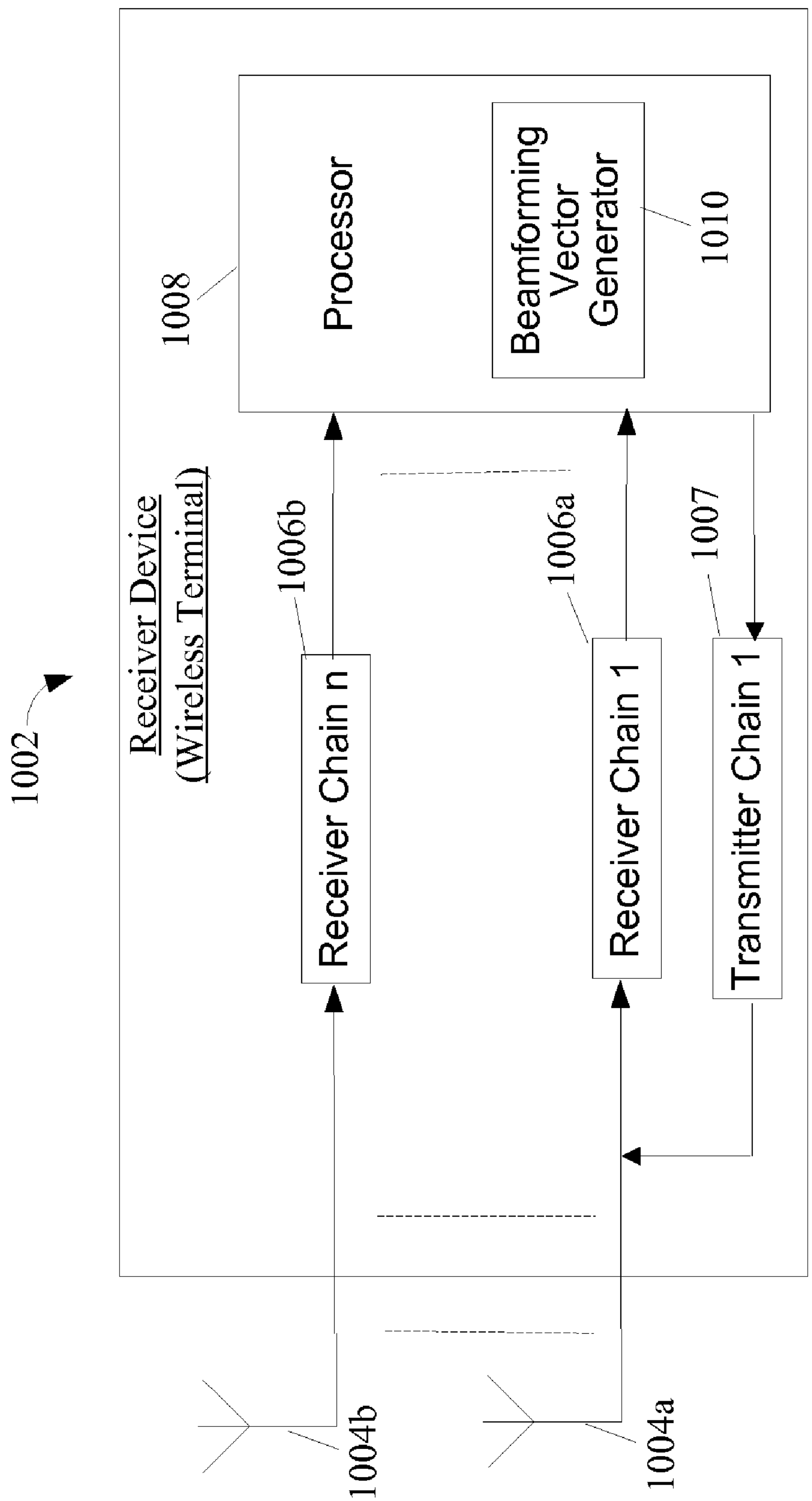
FIG. 10 is a block diagram illustrating a receiver device having multiple receiver chains and a single transmitter chain.

FIG. 10 is a block diagram illustrating a receiver device 1002 having multiple receiver chains and a single transmitter chain. The receiver device 1002 includes a plurality of antennas 1004, where each antenna is coupled to a different receiver chain 1006. The transmitter chain 1007 and receiver chains 1006*a* and 1006*b* are coupled to a processor 1008 where a beamforming vector generator 810 can calculate beamforming coefficients for each receiver chain 1006. According to one example, the beamforming vector generator 1010 may obtain beamforming coefficients based on a received transmission request to focus the receiver device 1002 in the direction of the received transmission request from an intended transmitter first device. The receiver device 1002 can transmit with power Pρ, where ρ is the correlation between the spatial signature from the intended transmitter device and the spatial signature from and interferer device and P is the echo power which is chosen to be inversely proportional to the received power of the transmission request from the intended transmitter device.

Figure 11:
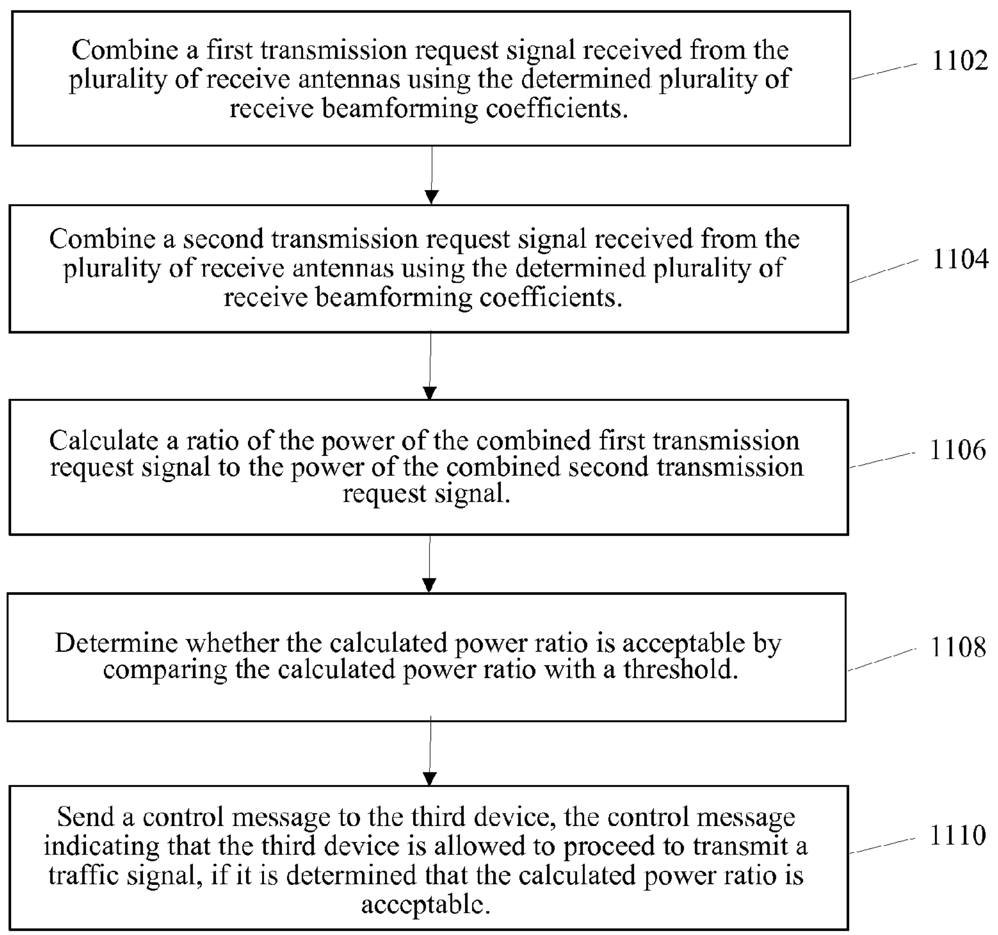
FIG. 11 illustrates a method operational in a receiver second device having a plurality of receive antennas but a single transmitter chain for transmitting a signal over a peer-to-peer communications to a transmitter first device.

FIG. 11 illustrates a method operational in a receiver second device having a plurality of receive antennas but a single transmitter chain for transmitting a signal over a peer-to-peer communications to a transmitter first device. That is, the second device is equipped with a plurality of receive chains and one transmit chain. The second device seeks to transmit a signal (e.g., request response signal) via the transmit chain coupled to a first antenna from among the plurality of antennas. The second device may have obtained a plurality of beamforming coefficients for the plurality of antennas.

Upon receiving a first transmission request signal from the desired transmitter over the plurality of antennas, the second device may combine (or reconstruct) the first transmission request signal using a determined plurality of receive beamforming coefficients 1102. Similarly, upon receiving a second transmission request signal from an interfering transmitter, the second device may combine the second transmission request signal received from the plurality of receive antennas using the determined plurality of receive beamforming coefficients 1104. For example, the beamforming coefficients may be selected to optimize reception of the first transmission request signal while minimizing reception of the second transmission request signal. A ratio of the power of the combined first transmission request signal to the power of the combined second transmission request signal may then be calculated 1106. The second device may then determine whether the calculated power ratio is acceptable by comparing the calculated power ratio with a threshold 1108. A control message may then be sent by the second device to the third device, the control message indicating that the third device is allowed to proceed to transmit a traffic signal, if it is determined that the calculated power ratio is acceptable 1110.

Figure 12:
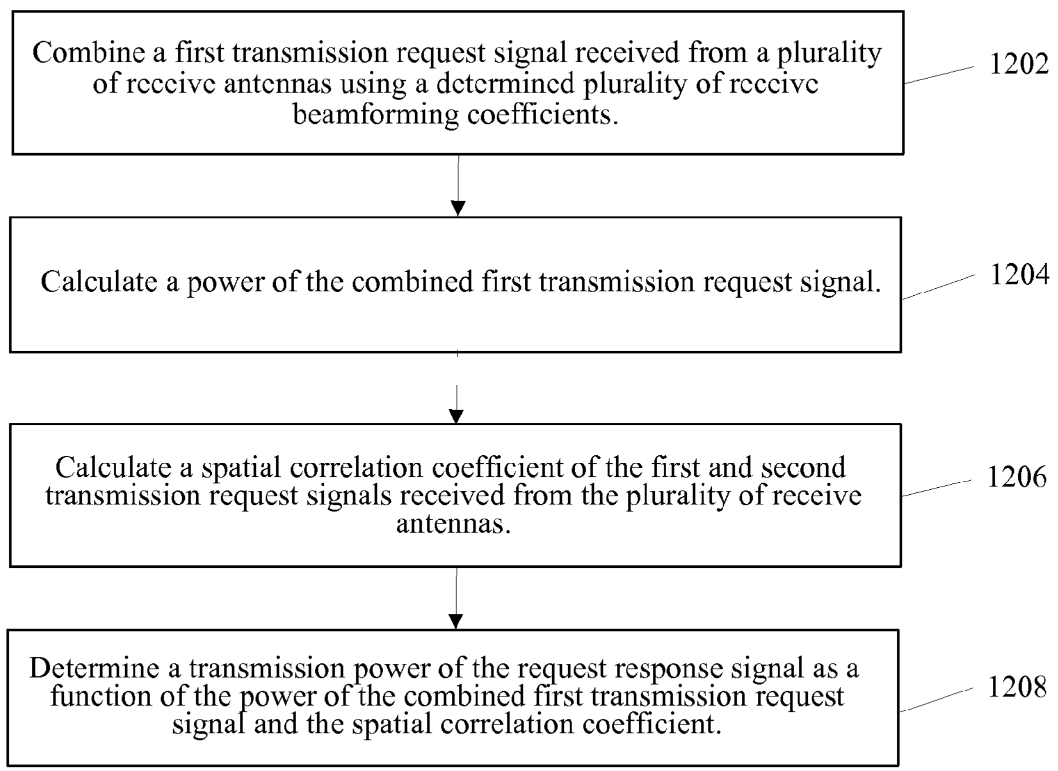
FIG. 12 illustrates another method operational in a receiver second device having a plurality of receive antennas but a single transmitter chain for transmitting a signal over a peer-to-peer communications to a transmitter first device.

FIG. 12 illustrates another method operational in a receiver second device having a plurality of receive antennas but a single transmitter chain for transmitting a signal over a peer-to-peer communications to a transmitter first device. The second device may combining a first transmission request signal received from the plurality of receive antennas using a determined plurality of receive beamforming coefficients 1202. The second device may then calculate the power of the combined first transmission request signal 1204. The spatial correlation coefficient of the first and second transmission request signals received from the plurality of receive antennas is then calculated by the second device 1206. The second device can then determine a transmission power for a request response signal to be transmitted to the first device as a function of the power of the combined first transmission request signal and the spatial correlation coefficient 1208. In one example, the transmission power of the request response signal may be set to be the power of the combined first transmission request signal multiplied by the spatial correlation.

The second device may also account for other transmitters in its vicinity. For example, the second device may monitoring to receive a third transmission request signal in each of the plurality of antennas, the third transmission request signal being transmitted by another transmitter device and indicating that the another transmitter device intends to transmit a traffic signal to yet another receiver device. The second device then calculates a spatial correlation coefficient of the first and third transmission request signals received from the plurality of receive antennas. The transmission power of the request response signal to be transmitted to the first device is then determined as a function of the power of the combined first transmission request signal and maximum of the spatial correlation coefficient of the first and second transmission request signals and the spatial correlation coefficient of the first and third transmission request signals.

Beamforming Broadcasting for Transmitter Yielding

The beamforming information provided by a receiver device may be utilized by an interfering device to determine whether it should perform transmitter yielding (e.g., forgo transmitting so that a higher priority peer-to-peer connection can proceed).

Figure 13:
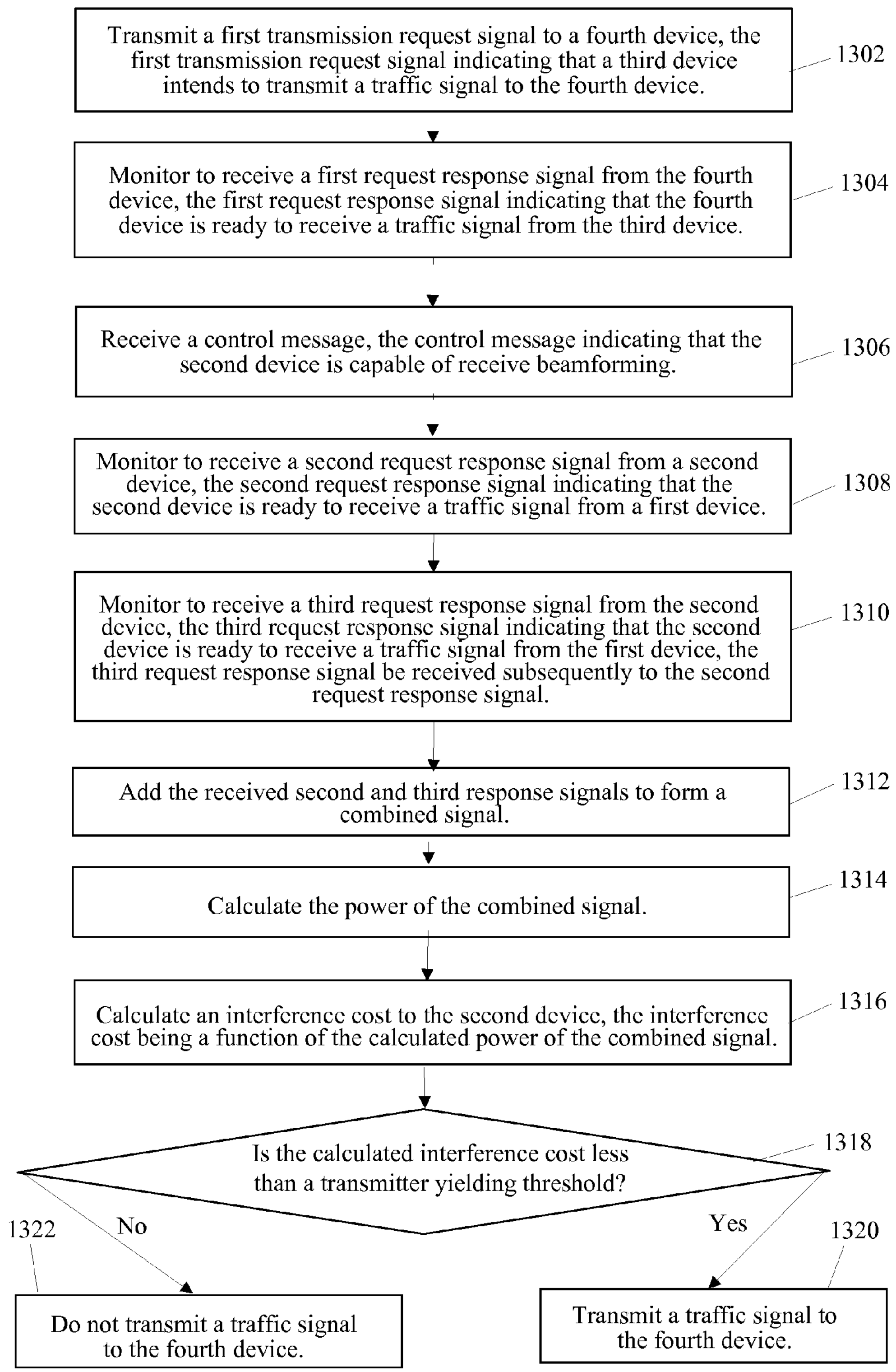
FIG. 13 illustrates a method operational on an interfering third device that determines whether it should forgo transmitting to a fourth device so that communications between higher priority first and second devices can take place.

FIG. 13 illustrates a method operational on an interfering third device that determines whether it should forgo transmitting to a fourth device so that communications between higher priority first and second devices can take place. In this example, the third device may have a connection with a fourth device. A first transmission request signal is transmitted to the fourth device, the first transmission request signal indicating that the third device intends to transmit a traffic signal to the fourth device 1302. The third device then monitors (a shared frequency space) to receive a first request response signal from the fourth device, the first request response signal indicating that the fourth device is ready to receive a traffic signal from the third device 1304.

The third device may also receive a control message from the second device indicating that the second device is capable of receive beamforming 1306. The control message includes information about indicative of the number of the plurality of receive antennas equipped at the second device. Subsequently, the third device may monitor to receive a second request response signal from the second device, the second request response signal indicating that the second device is ready to receive a traffic signal from a first device 1308. Additionally, the third device may also monitor to receive a third request response signal from the second device, the third request response signal indicating that the second device is ready to receive a traffic signal from the second device, the third request response signal received subsequently to the second request response signal 1310. In this example, the second and third request response signals may be different instances of the same request response signal which is transmitted by the second device through different antennas that may be configured to beamform in the direction of the first device.

The third device adds the received second and third response signals to form a combined signal 1312. The power of the combined signal may be calculated 1314. An interference cost to the second device is also calculated, the interference cost being a function of the calculated power of the combined signal 1316. For example, the interference cost may be calculated as a ratio of the power of the combined signal to the power of the second request response.

The third device may determining whether to transmit a traffic signal to the fourth device by comparing the calculated interference cost with a transmitter yielding threshold 1318. If the interference cost is less than the transmitter yielding threshold, then the third device transmits a traffic signal to the fourth device 1320. Otherwise, the third device yields and does not transmit its traffic signal to the fourth device 1322.

Figure 14:
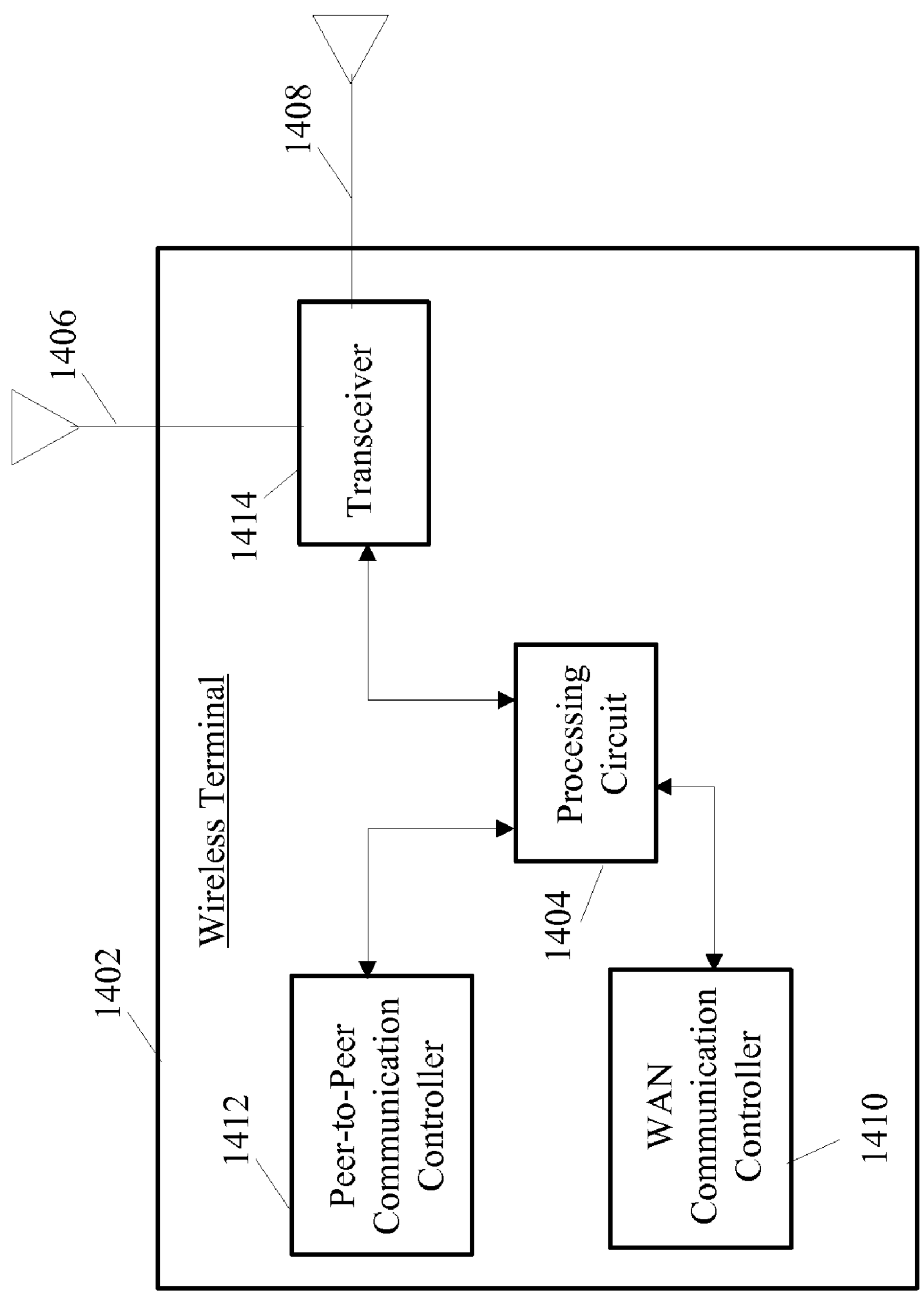
FIG. 14 is a block diagram of a first wireless terminal that may be configured to facilitate peer-to-peer communications with another wireless terminal over a shared frequency spectrum.

FIG. 14 is a block diagram of a first wireless terminal that may be configured to facilitate peer-to-peer communications with another wireless terminal over a shared frequency spectrum. The wireless terminal 1402 may include a processing circuit (e.g., one or more circuits or processors), a peer-to-peer communication controller 1412, a wide area network (WAN) controller 1410 and a transceiver 1414 coupled one or more antennas 1406 and 1408. The transceiver 1414 may include a (wireless) transmitter and a (wireless) receiver. In one example, the plurality of antennas may be receive antennas and/or transmit antennas. The wireless terminal 1402 may communicate via a managed network infrastructure using the WAN communication controller 1410 and/or it may communicate over a peer-to-peer network using the peer-to-peer communication controller 1412. When performing peer-to-peer communications, the first wireless terminal 1402 may be configured to perform one or more of the features illustrated in FIGS. 1-13, including transmitter yielding based on beamforming information for another wireless device, and receiver yielding based on multiple receive antennas.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more modules to perform the steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

According to yet another configuration, one or more circuits may be in a mobile device may be adapted to perform the operations and/or functions described in FIGS. 1-10. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9, 10, 11, 12, 13 and/or 14 may be rearranged and/or combined into a single component, step, or function or embodied in several components, steps, or functions. Additional elements, components, steps, and/or functions may also be added. The apparatus, devices, and/or components illustrated in FIGS. 1, 2, 3, 4, 6, 8, 10 and/or 14 may be configured or adapted to perform one or more of the methods, features, or steps described in FIGS. 5, 7, 9, 11, 12 and/or 13. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method of operating a second device equipped with a plurality of antennas for facilitating a wireless peer-to-peer connection with a first device, comprising:

operating a plurality of receive chains each being coupled with one of the plurality of antennas;

receiving a first transmission request signal from the first device, the first transmission request signal indicating that the first device intends to transmit a traffic signal to the second device, and the first transmission request signal being received in each of the plurality of antennas using the receive chains;

monitoring to receive a second transmission request signal, the second transmission request signal being transmitted by a third device and indicating that the third device intends to transmit a traffic signal to a fourth device, and the second transmission request signal being received in each of the plurality of antennas;

determining a plurality of receive beamforming coefficients as a function of the received first and second transmission request signals in each of the plurality of antennas, each of the plurality of receive beamforming coefficients corresponding to one of the plurality of antennas; and transmitting a request response signal to the first device, the request response signal indicating that the second device is ready to receive a traffic signal from the first device.

2. The method of claim 1, further comprising:

receiving a traffic signal from the first device, the traffic signal being received in each of the plurality of antennas;

combining the traffic signal received from the plurality of antennas using the plurality of receive beamforming coefficients; and decoding the combined traffic signal.

3. The method of claim 2, wherein the second device is equipped with a plurality of transmit chains each being coupled with one of the plurality of antenna, and wherein the request response signal is transmitted via the transmit chains with the plurality of antennas, the method further comprising:

multiplying the request response signal with each of the plurality of receive beamforming coefficients to generate a weighted request response signal; and transmitting each weighted request response signal with the corresponding one of the plurality of antennas.

4. The method of claim 2, wherein the second device is equipped with one transmit chain being connected via a switch to be coupled with one of the plurality of antenna at any given time, and wherein the request response signal is transmitted via the transmit chain with the plurality of antennas, the method further comprising:

multiplying the request response signal with a first one of the plurality of receive beamforming coefficients to generate a first weighted request response signal;

switching the transmit chain to be coupled with one of the plurality of antennas corresponding to the first one of the plurality of receive beamforming coefficients;

transmitting the first weighted request response signal with the corresponding one of the plurality of antennas in a first request response transmission time slot;

multiplying the request response signal with a second one of the plurality of receive beamforming coefficients to generate a second weighted request response signal; and switching the transmit chain to be coupled with one of the plurality of antennas corresponding to the second one of the plurality of receive beamforming coefficients; and transmitting the second weighted request response signal with the corresponding one of the plurality of antennas in a second request response transmission time slot, the second request response transmission time slot being subsequent to the first request response transmission time slot.

5. The method of claim 2, wherein the second device is equipped with one transmit chain being coupled to a first antenna from the plurality of antennas, and wherein the request response signal is transmitted via the transmit chain coupled to the first antenna.

6. The method of claim 5, further comprising:

combining the first transmission request signal received from the plurality of receive antennas using the determined plurality of receive beamforming coefficients;

combining the second transmission request signal received from the plurality of receive antennas using the determined plurality of receive beamforming coefficients;

calculating the ratio of the power of the combined first transmission request signal and the power of the combined second transmission request signal;

determining whether the calculated power ratio is acceptable by comparing the calculated power ratio with a threshold; and sending a control message to the third device, the control message indicating that the third device is allowed to proceed to transmit a traffic signal, if it is determined that the calculated power ratio is acceptable.

7. The method of claim 5, further comprising:

combining the first transmission request signal received from the plurality of receive antennas using the determined plurality of receive beamforming coefficients;

calculating the power of the combined first transmission request signal;

calculating the spatial correlation coefficient of the first and second transmission request signals received from the plurality of receive antennas; and determining the transmission power of the request response signal transmitted to the first device as a function of the power of the combined first transmission request signal and the spatial correlation coefficient.

8. The method of claim 7, wherein the transmission power of the request response signal is set to be the power of the combined first transmission request signal multiplied by the spatial correlation.

9. The method of claim 7, further comprising:

monitoring to receive a third transmission request signal in each of the plurality of antennas, the third transmission request signal being transmitted by another transmitter device and indicating that the another transmitter device intends to transmit a traffic signal to yet another receiver device;

calculating the spatial correlation coefficient of the first and third transmission request signals received from the plurality of receive antennas; and determining the transmission power of the request response signal transmitted to the first device as a function of the power of the combined first transmission request signal and maximum of the spatial correlation coefficient of the first and second transmission request signals and the spatial correlation coefficient of the first and third transmission request signals.

10. A second device configured to communicate with a first device within a wireless peer-to-peer communication network, comprising:

a transmitter and receiver for establishing a wireless peer-to-peer communication connection with the first device;

a plurality of antennas; and a processing circuit coupled to the transmitter and receiver, the processing circuit configured to:

operate a plurality of receive chains each being coupled with one of the plurality of antennas;

receive a first transmission request signal from the first device, the first transmission request signal indicating that the first device intends to transmit a traffic signal to the second device, and the first transmission request signal being received in each of the plurality of antennas using the receive chains;

monitor to receive a second transmission request signal, the second transmission request signal being transmitted by a third device and indicating that the third device intends to transmit a traffic signal to a fourth device, and the second transmission request signal being received in each of the plurality of antennas;

determine a plurality of receive beamforming coefficients as a function of the received first and second transmission request signals in each of the plurality of antennas, each of the plurality of receive beamforming coefficients corresponding to one of the plurality of antennas; and transmit a request response signal to the first device, the request response signal indicating that the second device is ready to receive a traffic signal from the first device.

11. The second device of claim 10, wherein the processing circuit is further configured to:

receive a traffic signal from the first device, the traffic signal being received in each of the plurality of antennas;

combine the traffic signal received from the plurality of antennas using the plurality of receive beamforming coefficients; and decode the combined traffic signal.

12. The second device of claim 11, wherein each of the plurality of transmit chains is coupled to one of the plurality of antenna, and wherein the request response signal is transmitted via the transmit chains with the plurality of antennas, wherein the processing circuit is further configured to:

multiply the request response signal with each of the plurality of receive beamforming coefficients to generate a weighted request response signal; and transmit each weighted request response signal with the corresponding one of the plurality of antennas.

13. The second device of claim 11, further comprising a transmit chain selectively coupled via a switch to one of the plurality of antenna at any given time, and wherein the request response signal is transmitted via the transmit chain with the plurality of antennas, wherein the processing circuit is further configured to:

multiply the request response signal with a first one of the plurality of receive beamforming coefficients to generate a first weighted request response signal;

switch the transmit chain to be coupled with one of the plurality of antennas corresponding to the first one of the plurality of receive beamforming coefficients;

transmit the first weighted request response signal with the corresponding one of the plurality of antennas in a first request response transmission time slot;

multiply the request response signal with a second one of the plurality of receive beamforming coefficients to generate a second weighted request response signal;

switch the transmit chain to be coupled with one of the plurality of antennas corresponding to the second one of the plurality of receive beamforming coefficients; and transmit the second weighted request response signal with the corresponding one of the plurality of antennas in a second request response transmission time slot, the second request response transmission time slot being subsequent to the first request response transmission time slot.

14. The second device of claim 11, further comprising:

a transmit chain coupled to a first antenna from the plurality of antennas, and wherein the request response signal is transmitted via the transmit chain coupled to the first antenna.

15. The second device of claim 14, wherein the processing circuit is further configured to:

combine the first transmission request signal received from the plurality of receive antennas using the determined plurality of receive beamforming coefficients;

combine the second transmission request signal received from the plurality of receive antennas using the determined plurality of receive beamforming coefficients;

calculate the ratio of the power of the combined first transmission request signal and the power of the combined second transmission request signal;

determine whether the calculated power ratio is acceptable by comparing the calculated power ratio with a threshold; and send a control message to the third device, the control message indicating that the third device is allowed to proceed to transmit a traffic signal, if it is determined that the calculated power ratio is acceptable.

16. The second device of claim 14, wherein the processing circuit is further configured to:

combine the first transmission request signal received from the plurality of receive antennas using the determined plurality of receive beamforming coefficients;

calculate the power of the combined first transmission request signal;

calculate the spatial correlation coefficient of the first and second transmission request signals received from the plurality of receive antennas; and determine the transmission power of the request response signal transmitted to the first device as a function of the power of the combined first transmission request signal and the spatial correlation coefficient.

17. The second device of claim 16, wherein the transmission power of the request response signal is set to be the power of the combined first transmission request signal multiplied by the spatial correlation.

18. The second device of claim 16, wherein the processing circuit is further configured to:

monitor to receive a third transmission request signal in each of the plurality of antennas, the third transmission request signal being transmitted by another transmitter device and indicating that the another transmitter device intends to transmit a traffic signal to yet another receiver device;

calculate the spatial correlation coefficient of the first and third transmission request signals received from the plurality of receive antennas; and determine the transmission power of the request response signal transmitted to the first device as a function of the power of the combined first transmission request signal and maximum of the spatial correlation coefficient of the first and second transmission request signals and the spatial correlation coefficient of the first and third transmission request signals.

19. A second device configured to communicate with a first device within a wireless peer-to-peer communication network, comprising:

means for operating a plurality of receive chains each being coupled with one of a plurality of antennas;

means for receiving a first transmission request signal from the first device, the first transmission request signal indicating that the first device intends to transmit a traffic signal to the second device, and the first transmission request signal being received in each of the plurality of antennas using the receive chains;

means for monitoring to receive a second transmission request signal, the second transmission request signal being transmitted by a third device and indicating that the third device intends to transmit a traffic signal to a fourth device, and the second transmission request signal being received in each of the plurality of antennas;

means for determining a plurality of receive beamforming coefficients as a function of the received first and second transmission request signals in each of the plurality of antennas, each of the plurality of receive beamforming coefficients corresponding to one of the plurality of antennas; and means for transmitting a request response signal to the first device, the request response signal indicating that the second device is ready to receive a traffic signal from the first device.

20. The second device of claim 19, further comprising:

means for receiving a traffic signal from the first device, the traffic signal being received in each of the plurality of antennas;

means for combining the traffic signal received from the plurality of antennas using the plurality of receive beamforming coefficients; and means for decoding the combined traffic signal.

21. The second device of claim 20, further comprising:

a plurality of transmit chains each being coupled with one of the plurality of antenna, and wherein the request response signal is transmitted via the transmit chains with the plurality of antennas;

means for multiplying the request response signal with each of the plurality of receive beamforming coefficients to generate a weighted request response signal; and means for transmitting each weighted request response signal with the corresponding one of the plurality of antennas.

22. The second device of claim 20, further comprising:

a transmit chain;

means for multiplying the request response signal with a first one of the plurality of receive beamforming coefficients to generate a first weighted request response signal;

means for switching the transmit chain to be coupled with one of the plurality of antennas corresponding to the first one of the plurality of receive beamforming coefficients;

means for transmitting the first weighted request response signal with the corresponding one of the plurality of antennas in a first request response transmission time slot;

means for multiplying the request response signal with a second one of the plurality of receive beamforming coefficients to generate a second weighted request response signal; and means for switching the transmit chain to be coupled with one of the plurality of antennas corresponding to the second one of the plurality of receive beamforming coefficients; and means for transmitting the second weighted request response signal with the corresponding one of the plurality of antennas in a second request response transmission time slot, the second request response transmission time slot being subsequent to the first request response transmission time slot.

23. The second device of claim 20, further comprising:

a transmit chain coupled to a first antenna from the plurality of antennas, and wherein the request response signal is transmitted via the transmit chain coupled to the first antenna.

24. The second device of claim 23, further comprising:

means for combining the first transmission request signal received from the plurality of receive antennas using the determined plurality of receive beamforming coefficients;

means for combining the second transmission request signal received from the plurality of receive antennas using the determined plurality of receive beamforming coefficients;

means for calculating the ratio of the power of the combined first transmission request signal and the power of the combined second transmission request signal;

means for determining whether the calculated power ratio is acceptable by comparing the calculated power ratio with a threshold; and means for sending a control message to the third device, the control message indicating that the third device is allowed to proceed to transmit a traffic signal, if it is determined that the calculated power ratio is acceptable.

25. The second device of claim 23, further comprising:

means for combining the first transmission request signal received from the plurality of receive antennas using the determined plurality of receive beamforming coefficients;

means for calculating the power of the combined first transmission request signal;

means for calculating the spatial correlation coefficient of the first and second transmission request signals received from the plurality of receive antennas; and means for determining the transmission power of the request response signal transmitted to the first device as a function of the power of the combined first transmission request signal and the spatial correlation coefficient.

26. The second device of claim 25, further comprising:

means for monitoring to receive a third transmission request signal in each of the plurality of antennas, the third transmission request signal being transmitted by another transmitter device and indicating that the another transmitter device intends to transmit a traffic signal to yet another receiver device;

means for calculating the spatial correlation coefficient of the first and third transmission request signals received from the plurality of receive antennas; and means for determining the transmission power of the request response signal transmitted to the first device as a function of the power of the combined first transmission request signal and maximum of the spatial correlation coefficient of the first and second transmission request signals and the spatial correlation coefficient of the first and third transmission request signals.

27. A circuit for facilitating peer-to-peer communications and beamforming, wherein the circuit operates in a second device having a plurality of antennas for facilitating a wireless peer-to-peer connection with a first device, wherein the circuit is adapted to:

operate a plurality of receive chains each being coupled with one of the plurality of antennas;

receive a first transmission request signal from the first device, the first transmission request signal indicating that the first device intends to transmit a traffic signal to the second device, and the first transmission request signal being received in each of the plurality of antennas using the receive chains;

monitor to receive a second transmission request signal, the second transmission request signal being transmitted by a third device and indicating that the third device intends to transmit a traffic signal to a fourth device, and the second transmission request signal being received in each of the plurality of antennas;

determine a plurality of receive beamforming coefficients as a function of the received first and second transmission request signals in each of the plurality of antennas, each of the plurality of receive beamforming coefficients corresponding to one of the plurality of antennas; and transmit a request response signal to the first device, the request response signal indicating that the second device is ready to receive a traffic signal from the first device.

28. A non-transitory machine-readable medium comprising instructions for a second device equipped with a plurality of antennas to facilitate a wireless peer-to-peer connection with a first device, which when executed by a processor causes the processor to:

operate a plurality of receive chains each being coupled with one of the plurality of antennas;

receive a first transmission request signal from the first device, the first transmission request signal indicating that the first device intends to transmit a traffic signal to the second device, and the first transmission request signal being received in each of the plurality of antennas using the receive chains;

monitor to receive a second transmission request signal, the second transmission request signal being transmitted by a third device and indicating that the third device intends to transmit a traffic signal to a fourth device, and the second transmission request signal being received in each of the plurality of antennas;

determine a plurality of receive beamforming coefficients as a function of the received first and second transmission request signals in each of the plurality of antennas, each of the plurality of receive beamforming coefficients corresponding to one of the plurality of antennas; and transmit a request response signal to the first device, the request response signal indicating that the second device is ready to receive a traffic signal from the first device.

29. A method of operational in a third wireless device in a peer to peer communication network, the third device having a connection with a fourth device, comprising:

transmitting a first transmission request signal to the fourth device, the first transmission request signal indicating that the third device intends to transmit a traffic signal to the fourth device;

monitoring to receive a first request response signal from the fourth device, the first request response signal indicating that the fourth device is ready to receive a traffic signal from the third device;

monitoring to receive a second request response signal from a second device, the second request response signal indicating that the second device is ready to receive a traffic signal from a first device;

monitoring to receive a third request response signal from the second device, the third request response signal indicating that the second device is ready to receive a traffic signal from the first device, the third request response signal received subsequently to the second request response signal;

adding the received second and third response signals to form a combined signal;

calculating the power of the combined signal;

calculating an interference cost to the first device, the interference cost being a function of the calculated power of the combined signal;

determining whether to transmit a traffic signal to the fourth device by comparing the calculated interference cost with a transmitter yielding threshold; and transmitting a traffic signal to the fourth device if it is determined to transmit a traffic signal.

30. The method of claim 29, further comprising:

prior to receiving the second and third request response signals, receiving a control message, the control message indicating that the second device is capable of receive beamforming.

31. The method of claim 30, wherein the control message includes information indicative of the number of the plurality of receive antennas equipped at the second device.

32. A third device having a wireless peer-to-peer connection with a fourth device, comprising:

a transmitter and receiver for establishing the wireless peer-to-peer connection with the fourth device; and a processing circuit adapted to perform transmitter yielding within a peer-to-peer network, the processing circuit configured to:

transmit a first transmission request signal to the fourth device, the first transmission request signal indicating that the third device intends to transmit a traffic signal to the fourth device;

monitor to receive a first request response signal from the fourth device, the first request response signal indicating that the fourth device is ready to receive a traffic signal from the third device;

monitor to receive a second request response signal from a second device, the second request response signal indicating that the second device is ready to receive a traffic signal from a first device;

monitor to receive a third request response signal from the second device, the third request response signal indicating that the second device is ready to receive a traffic signal from the first device, the third request response signal received subsequently to the second request response signal;

add the received second and third response signals to form a combined signal;

calculate the power of the combined signal;

calculate an interference cost to the first device, the interference cost being a function of the calculated power of the combined signal;

determine whether to transmit a traffic signal to the fourth device by comparing the calculated interference cost with a transmitter yielding threshold; and transmit a traffic signal to the fourth device if it is determined to transmit a traffic signal.

33. The third device of claim 32, the processing circuit further configured to:

receiving a control message, the control message indicating that the second device is capable of receive beamforming.

34. The third device of claim 32, wherein the control message includes information indicative of the number of the plurality of receive antennas equipped at the second device.

35. A third wireless device having a wireless peer-to-peer connection with a fourth device, comprising:

means for transmitting a first transmission request signal to the fourth device, the first transmission request signal indicating that the third device intends to transmit a traffic signal to the fourth device;

means for monitoring to receive a first request response signal from the fourth device, the first request response signal indicating that the fourth device is ready to receive a traffic signal from the third device;

means for monitoring to receive a second request response signal from a second device, the second request response signal indicating that the second device is ready to receive a traffic signal from a first device;

means for monitoring to receive a third request response signal from the second device, the third request response signal indicating that the second device is ready to receive a traffic signal from the first device, the third request response signal received subsequently to the second request response signal;

means for adding the received second and third response signals to form a combined signal;

means for calculating the power of the combined signal;

means for calculating an interference cost to the first device, the interference cost being a function of the calculated power of the combined signal;

means for determining whether to transmit a traffic signal to the fourth device by comparing the calculated interference cost with a transmitter yielding threshold; and means for transmitting a traffic signal to the fourth device if it is determined to transmit a traffic signal.

36. The third device of claim 35, further comprising:

means for receiving a control message, the control message indicating that the second device is capable of receive beamforming.

37. A circuit for interference mitigation in a peer-to-peer network, wherein the circuit operates in a third device having a wireless peer-to-peer connection with a fourth device, wherein the circuit is adapted to:

transmit a first transmission request signal to the fourth device, the first transmission request signal indicating that the third device intends to transmit a traffic signal to the fourth device;

monitor to receive a first request response signal from the fourth device, the first request response signal indicating that the fourth device is ready to receive a traffic signal from the third device;

monitor to receive a second request response signal from a second device, the second request response signal indicating that the second device is ready to receive a traffic signal from a first device;

monitor to receive a third request response signal from the second device, the third request response signal indicating that the second device is ready to receive a traffic signal from the first device, the third request response signal received subsequently to the second request response signal;

add the received second and third response signals to form a combined signal;

calculate the power of the combined signal;

calculate an interference cost to the first device, the interference cost being a function of the calculated power of the combined signal;

determine whether to transmit a traffic signal to the fourth device by comparing the calculated interference cost with a transmitter yielding threshold; and transmit a traffic signal to the fourth device if it is determined to transmit a traffic signal.

38. The circuit of claim 37, wherein the circuit is further adapted to:

receive a control message, the control message indicating that the second device is capable of receive beamforming.

39. A non-transitory machine-readable medium comprising instructions for a third device to communicate with a fourth device within a wireless peer-to-peer communication network while performing transmitter yielding, which when executed by a processor causes the processor to:

transmit a first transmission request signal to the fourth device, the first transmission request signal indicating that the third device intends to transmit a traffic signal to the fourth device;

monitor to receive a first request response signal from the fourth device, the first request response signal indicating that the fourth device is ready to receive a traffic signal from the third device;

monitor to receive a second request response signal from a second device, the second request response signal indicating that the second device is ready to receive a traffic signal from a first device;

monitor to receive a third request response signal from the second device, the third request response signal indicating that the second device is ready to receive a traffic signal from the first device, the third request response signal received subsequently to the second request response signal;

add the received second and third response signals to form a combined signal;

calculate the power of the combined signal;

calculate an interference cost to the first device, the interference cost being a function of the calculated power of the combined signal;

determine whether to transmit a traffic signal to the fourth device by comparing the calculated interference cost with a transmitter yielding threshold; and transmit a traffic signal to the fourth device if it is determined to transmit a traffic signal.

40. The non-transitory machine-readable medium of claim 39, further comprising instructions which when executed by a processor causes the processor to:

receive a control message, the control message indicating that the second device is capable of receive beamforming.

* * * * *